(12) United States Patent  (10) Patent No.: US 8,764,170 B2
Ishikawa  (45) Date of Patent: Jul. 1, 2014

(54) INK-JET HEAD, INK-JET PRINTER, AND INK-JET RECORDING METHOD

(75) Inventor: Wataru Ishikawa, Tokyo (JP)

(73) Assignee: Konica Minolta Medical & Graphic, Inc., Tokyo (JP)

(*) Notice: Subject to any disclaimer, the term of this patent is extended or adjusted under 35 U.S.C. 154(b) by 627 days.

(21) Appl. No.: 12/523,973

(22) PCT Filed: Jan. 25, 2008

(86) PCT No.: PCT/JP2008/051063
§ 371 (c)(1),
(2), (4) Date: Jul. 21, 2009

(87) PCT Pub. No.: WO2008/096618
PCT Pub. Date: Aug. 14, 2008

(65) Prior Publication Data
US 2010/0079566 A1   Apr. 1, 2010

(30) Foreign Application Priority Data

Feb. 9, 2007 (JP) .................................. 2007030297
Mar. 27, 2007 (JP) .................................. 2007081248

(51) Int. Cl.
B41J 2/015 (2006.01)
(52) U.S. Cl.
USPC ........................................................ 347/84
(58) Field of Classification Search
None
See application file for complete search history.

(56) References Cited

U.S. PATENT DOCUMENTS

| 5,943,080 A * | 8/1999 | Kubota et al. ................. 347/100 |
| 2003/0151646 A1 | 8/2003 | Miyamoto et al. |
| 2003/0231226 A1 | 12/2003 | Ishikawa et al. |
| 2005/0023508 A1 * | 2/2005 | Fujimaki ....................... 252/587 |
| 2005/0277125 A1 * | 12/2005 | Benn et al. ......................... 435/6 |
| 2006/0204732 A1 * | 9/2006 | Aoai ........................... 428/195.1 |
| 2007/0002108 A1 * | 1/2007 | Sugahara ......................... 347/92 |
| 2007/0019051 A1 * | 1/2007 | Nakazawa .................... 347/102 |

FOREIGN PATENT DOCUMENTS

| EP | 0140611 | 5/1985 |
| EP | 0525787 | 2/1993 |

(Continued)

OTHER PUBLICATIONS

Japanese Office Action Application No. 2008-557062 (3 pages) and English Translation thereof (4 pages).

(Continued)

Primary Examiner — Matthew Luu
Assistant Examiner — Erica Lin
(74) Attorney, Agent, or Firm — Lucas & Mercanti, LLP

(57) ABSTRACT

Disclosed is an inkjet recording method wherein an image is formed on a recording medium by spraying an ink containing at least a photopolymerizable compound onto the recording medium through a nozzle of an inkjet head. This inkjet recording method enables to perform a stable image recording by suppressing formation of a precipitate in the head. This inkjet recording method is characterized in that in an inkjet head, which is used for forming an image on a recording medium by spraying an inkjet ink containing at least a photopolymerizable compound through a nozzle, the surface of at least a part of metals constituting the internal member of the inkjet head which is in contact with the inkjet ink is subjected to a passivation treatment or an insulation coating treatment.

7 Claims, 8 Drawing Sheets

(56) References Cited

FOREIGN PATENT DOCUMENTS

| | | |
|---|---|---|
| JP | 61-100463 | 5/1986 |
| JP | 61-167566 | 7/1986 |
| JP | 62-247044 | 10/1987 |
| JP | 08-209048 | 8/1996 |
| JP | 10-072561 | 3/1998 |
| JP | 2002-067330 | 3/2002 |
| JP | 2003-268271 | 9/2003 |
| JP | 200434543 | 2/2004 |
| JP | 2004-255614 | 9/2004 |
| JP | 2005-007574 | 1/2005 |
| JP | 2005238742 | 9/2005 |
| JP | 2005290246 | 10/2005 |
| JP | 2006159619 | 6/2006 |
| JP | 2006-334940 | 12/2006 |
| JP | 2007-051176 | 3/2007 |
| WO | 03/033602 | 4/2003 |
| WO | 2006/013707 | 2/2006 |

OTHER PUBLICATIONS

Japanese Office Action dated Apr. 25, 2012, Notice of Reasons for Refusal (4 pages).
English translation of Office Action dated Apr. 25, 2012 (4 pages).
JIS H 5302 Aluminum Gokin Die-cast, Japanese Standards Association, Jul. 20, 2006, pp. 2,4, Tables 1, 2.

* cited by examiner

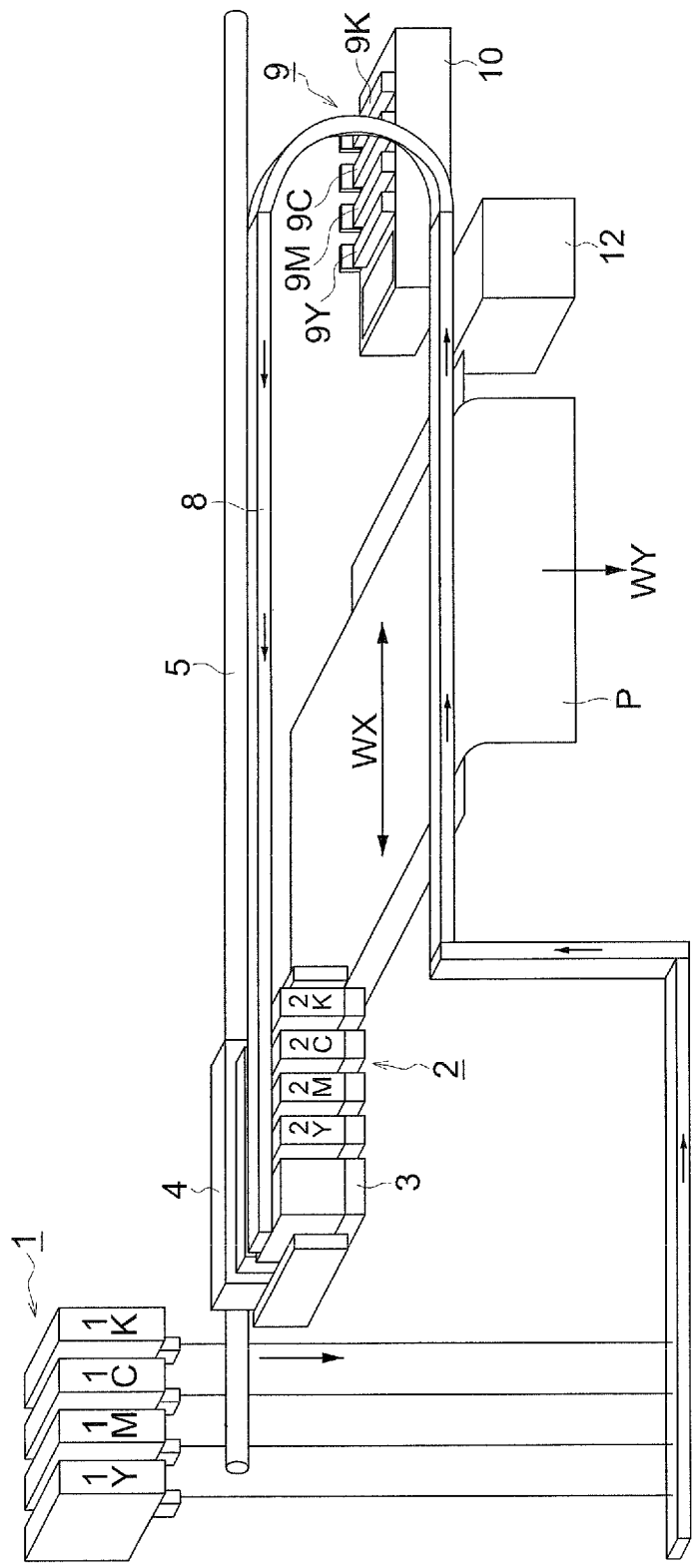

REAR ←——→ FRONT

INK-JET HEAD, INK-JET PRINTER, AND INK-JET RECORDING METHOD

CROSS REFERENCE TO RELATED APPLICATION

This is a U.S. National Phase Application under 35 U.S.C. 371 of International Application PCT/JP2008/051063, filed on Jan. 25, 2008, which claims the priorities of Japanese Applications Nos. JP2007-081248, filed Mar. 27, 2007, and JP2007-030297 filed Feb. 9, 2007, the entire contents of each of these Applications are hereby incorporated by reference.

TECHNICAL FIELD

The present invention relates to an ink-jet head used to eject an ink-jet ink containing a photopolymerizable compound, an ink-jet printer, and an ink-jet recording method using the same.

BACKGROUND

Over recent years, due to simple and inexpensive production of images, an ink-jet recording system has been used in a wide variety of printing fields including specialty printing such as photograph, various types of printing, marking, and color filters. Generally, a water-based ink-jet ink containing water as a main solvent is recorded onto exclusive paper with ink absorbability serving as a recording medium. There have also been put into practical use ink-jet systems, other than such a water-based one, such as a phase-change ink-jet system utilizing wax ink which is solid at room temperature; a solvent-based ink-jet system utilizing ink mainly containing a quick-drying organic solvent; and an actinic radiation curable-type ink-jet system carrying out cross-linking via irradiation of actinic energy beams (radiation) such as ultraviolet radiation (UV light) after recording.

Of these, over recent years, attention is being paid to the ultraviolet radiation curable-type ink-jet system in view of emission of a relatively low odor, quick-drying properties, and printability onto recording media with no ink absorbability, compared to the solvent-based ink-jet system. Accordingly, a wide variety of actinic radiation curable-type ink-jet technologies have been disclosed.

Actinic radiation curable-type ink-jet inks employing radically polymerizable compounds represented by (meth)acrylates have been put into practical use. Due to adhesion to recording media, less odor, and less polymerization inhibition by oxygen, actinic radiation curable-type ink-jet inks employing cationically polymerizable compounds, as well as ink-jet printers utilizing the same have recently been proposed (for example, refer to Patent Documents 1, 2, and 3).

In contrast, as to an ink-jet head, there is frequently used a metal such as stainless steel or aluminum as a material constituting an ink supply path in the head and a filter to remove foreign substances.

In a water-based ink-jet head commonly used, a metal inside the head was often corroded by water present in an ink. Such corrosion often caused clogging by corroded materials in the ink-jet head, whereby, in severe cases, the ink-jet head itself was frequently disabled completely. Therefore, to prevent contact of the metal surface with water, a resin has been coated on the liquid contact portion of the metal (for example, refer to Patent Document 4).

On the other hand, when ink ejection for recording is carried out using an ink containing a photopolymerizable compound from an ink-jet head constituted of the metallic material as described above, despite almost no corrosion of the metal constituting a liquid contact portion of the ink-jet head due to almost no presence of water in the ink, precipitates have become confirmed inside the ink-jet head with the elapsed time of ejection of the ink-jet ink. It has been found that these precipitates caused clogging of the ink supply path, and then reaching thereof to the nozzle section caused ejection failure.

In general, precipitation with respect to an actinic radiation curable-type ink-jet ink is caused by leaked light of actinic radiation or pigment aggregation in some cases, and therefore various countermeasures against these phenomena have been taken so far. However, with regard to a cationically polymerizable ink, when a metallic material was used as a liquid contact member of an ink-jet printer, it has been found that undesirable electrochemical reaction occurred and thereby decomposed materials or polymerized materials of ink components were generated. When a metallic material is used as the liquid contact member of an ink-jet printer in this manner, unexpected ink polymerization reaction has been found to occur with long-term contact of a cationically polymerizable ink with the metallic material.

Such a metallic material is commonly, for example, an electrically conductive material. For example, SUS, copper, or aluminum is employed as a conductive liquid contact member in an ink flow path of an ink-jet printer. Further, an example is known in which a conductive liquid contact member is employed for an ink-jet head of an ink-jet printer. It is thought that these electrically conductive members usually exhibit excellent durability to various inks such as a water-based ink-jet ink, a solvent-based ink-jet ink, an oil-based ink-jet ink, an ultraviolet radiation curable-type ink-jet ink, and a solid-based ink-jet ink; and also adversely affect such inks only to a small extent.

It was found that when any of these electrically conductive members came into contact with a polymerizable, conductive ink, undesirable electrochemical reaction occurred, whereby decomposed materials or polymerized materials of ink components were generated in a flow path or an ink-jet head. Further, corrosion causes metal dissolution. Accordingly, when an ink containing a polymerizable compound is used, this electromotive force or metal dissolution triggers unexpected ink polymerization reaction in cases when the ink remains in contact with the interior of the flow path or ink-jet head over a long-term period. Especially, a cationically polymerizable actinic radiation curable-type ink-jet ink containing a photolytically acid generating agent such as an onium salt as an essential material tends to produce such a problem due to relatively high electrical conductivity of the ink.

These reaction products are not redissolved in the ink. Therefore, deposition thereof in an ink-jet head, specifically in a nozzle peripheral portion causes a decrease in ejection straightness. In worst cases, unrecoverable nozzle clogging is caused.

Patent Document 1: Unexamined Japanese Patent Application Publication No. (hereinafter also referred to as JP-A) 2005-290246
Patent Document 2: JP-A 2004-34543
Patent Document 3: JP-A 2005-238742
Patent Document 4: JP-A 2006-159619

DISCLOSURE OF THE INVENTION

Problems to be Solved by the Invention

An object of the present invention is to provide, in an ink-jet head forming an image on a recording medium by ejecting an ink-jet ink containing at least a precipitates in an ink contact portion and to carry out image recording with excellent ejection stability; an ink-jet printer; and an ink-jet recording method using the same.

Means to Solve the Problems

The above problems were able to be solved by the following constitution:

Item 1. In an ink-jet head used to form an image on a recording medium by ejecting an ink-jet ink containing at least a photopolymerizable compound from a nozzle, wherein a surface of a metal constituting a liquid contact member in contact with the ink-jet ink inside the ink-jet head is at least partially subjected to a passive treatment or an insulating film treatment.

Item 2. The ink-jet head described in item 1 above, wherein the surface of the metal constituting the above liquid contact member in contact with an ink-jet ink is entirely subjected to a passive treatment or an insulating film treatment.

Item 3. The ink-jet head described in item 1 or 2 above, wherein the metal is at least one selected from aluminum, stainless steel, zirconia, copper, and brass.

Item 4. The ink-jet head described in any one of items 1-3 above, wherein the liquid contact member is at least one selected from a manifold, a filter, a connection portion, and a chassis.

Item 5. The ink-jet head described in any one of items 1-4 above, wherein the metal subjected to the passive treatment or the insulating film treatment is an alumite-treated aluminum member.

Item 6. The ink-jet head described in any one of items 1-4 above, wherein the metal subjected to the passive treatment or the insulating film treatment is an alumite-treated silicon-containing aluminum member.

Item 7. The ink-jet head described in item 6 above, wherein the silicon content of the alumite-treated silicon-containing aluminum member is at least 10%.

Item 8. The ink-jet head described in any one of items 5-7 above, wherein the alumite-treated aluminum member and the alumite-treated silicon-containing aluminum member are each a member generating no bubbles and causing no color change of a solution when evaluated by the following evaluation method.

Evaluation method: a member to be evaluated (an alumite-treated aluminum member) is immersed in a test solution of 25° C. prepared by dripping a few drops of a 1% by mass solution of phenolphthalein into a 0.2% by mass solution of NaCl; and subsequently, a voltage of 2.0 V is applied for 90 seconds between electrodes wherein the member to be evaluated and a stainless steel plate are arranged as a cathode and an anode respectively to visually evaluate bubble generation from the member to be evaluated and color change of the test solution.

Item 9. The ink-jet head described in any one of items 5-8 above, wherein an alumite film thicknesses of the alumite-treated aluminum member and the alumite-treated silicon-containing aluminum member are each at least 9 μm.

Item 10. An ink-jet printer forming an image on a recording medium by ejecting an ink-jet ink containing at least a photopolymerizable compound from a nozzle of an ink-jet head, wherein the ink-jet head is one described in any one of items 1-9 above.

Item 11. An ink-jet recording method comprising the steps of: a) ejecting an ink-jet ink onto a recording medium from a nozzle of an ink-jet head, and the ink-jet ink containing at least a photopolymerizable compound, and b) using the ink-jet printer described in item 10 above to make an image, wherein a photopolymerizable compound contained in the ink-jet ink is a cationically polymerizable monomer which is an oxetane ring-containing compound or an epoxy compound.

Item 12. The ink-jet recording method described in item 11 above, wherein the ink-jet ink contains a vinyl ether compound as a cationically polymerizable monomer.

Item 13. The ink-jet recording method described in item 11 or 12 above, wherein the ink-jet ink contains a photolytically acid generating agent.

Effects of the Invention

According to the present invention, there were able to be provided an ink-jet head and an ink-jet printer enabling to inhibit occurrence of precipitates in an ink contact portion and to carry out image recording with excellent ejection stability, as well as an ink-jet recording method using the same.

BRIEF DESCRIPTION OF THE DRAWINGS

FIG. 1 A view showing the entire constitution of an ink-jet printer used in the present invention.

Figure 2A:
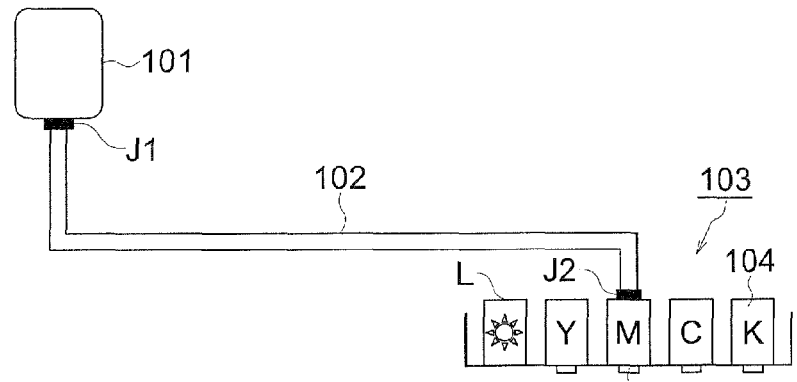
FIG. 2 A schematic constitutional view showing one example of an ink supply path constitution in the ink-jet printer of the present invention.

DESCRIPTION OF THE SYMBOLS 1 and 101: ink tanks
2, 73, and 104: ink-jet heads
3: actinic energy radiation source
4 and 103: carriages
5: carriage guide
8 and 102: ink supply paths
9: suction cap
10: maintenance unit
12: waste ink container
48a and 48b: manifolds
49: connection portion
51 and 107: filters
54: chassis
71: recording apparatus
72: head carriage
74: irradiation member
75: platen section
76: guide member
77: bellows structure
78: irradiation source
81: ink ejection orifice 106: intermediate tank anterior chamber
108: intermediate tank
110: filter box
111: filter adjacent portion
J1-J6: joints
N: nozzle
P: recording medium

BEST MODE TO CARRY OUT THE INVENTION

The best mode to carry out the present invention will now be detailed.

In view of the above problems, the present inventor conducted diligent investigations, and then found that an ink-jet head enabling to inhibit generation of precipitates and exhibiting excellent ejection stability was able to be realized using an ink-jet head used to form an image on a recording medium by ejecting an ink-jet ink containing at least a photopolymerizable compound from a nozzle wherein the surface of a metal constituting a liquid contact member in contact with the ink-jet ink inside the ink-jet head is at least partially subjected to passive treatment or insulating film treatment. Thus, the present invention was completed.

Namely, in an ink-jet head used for an ink-jet recording method employing an ink-jet ink containing a photopolymerizable compound (also referred to as an actinic radiation curable-type ink), various types of metals are used for an ink contact member inside the head. Therefore, it was found out that in an ink-jet ink containing a photopolymerizable compound, specifically in a cationically polymerizable curable-type ink-jet ink, a photopolymerization initiator contained in the ink-jet ink and such a metal reacted together, whereby a resulting reaction product served as a polymerization initiator to produce precipitates. As a result, it was found that the above problems were able to be solved by applying passive treatment or insulating film treatment to at least a part of the surface of a metal, preferably the entire surface of the metal constituting a liquid contact member in contact with the ink-jet ink inside the ink-jet head.

<<Ink-Jet Printer>>

The entire constitution of an ink-jet printer used for the ink-jet recording method of the present invention will now be described with reference to the accompanying drawings.

An ink-jet printer used in the present invention is mainly constituted of an ink tank to store an ink-jet ink (hereinafter also referred to simply as an ink) containing a cationically polymerizable composition; an ink supply path to send an ink from the ink tank to an ink-jet head (hereinafter also referred to simply as a head); an ink-jet head to eject the ink supplied from the ink supply path onto a recording medium; and an actinic radiation irradiation source to cure ink droplets having been deposited on the recording medium.

FIG. 1 is a view showing the entire constitution of an ink-jet printer used in the present invention.

The symbol 1 represents an ink tank to store and supply an ink containing a photopolymerizable compound. In FIG. 1, a constitution composed of yellow ink tank 1Y, magenta ink tank 1M, cyan ink tank 1C, and black ink tank 1K is illustrated as an example. The symbol 2 represents an ink-jet head having a nozzle to form an image by ejecting ink droplets onto a recording medium and incorporating yellow ink-jet head 2Y, magenta ink-jet head 2M, cyan ink-jet head 2C, and black ink-jet head 2K. The symbol 3 represents an actinic energy radiation source to irradiate UV radiation, that is, actinic energy radiation to an ink having been deposited on a recording medium.

The symbol 4 represents a carriage. Carriage 4 integrally holds ink-jet head 2 and energy radiation source 3 and reciprocally moves via guiding of carriage guide 5 as shown by arrow WX to scan recording medium P, and then recording medium P is driven in the arrow WY direction to form an image on recording medium P.

A recording ink is supplied from ink tank 1 to ink-jet head 2 through ink supply path 8.

The symbol 10 represents a maintenance unit with suction cap 9 to cap ink-jet head 2 for recovery treatment of ink-jet head 2. The symbol 12 represents a waste ink container to store waste ink, which receives and stores an ink having forcefully been ejected from ink-jet head 2 on flushing.

FIG. 2 is a constitutional view showing one example of an ink supply path constitution in the ink-jet printer of the present invention.

in FIG. 2a, ink tank 101 is connected to ink supply path 102 via joint J1, and further the end portion of ink supply path 102 is connected, via joint J2, to head 104 housed in carriage 103. Ink droplets are ejected onto a recording medium from nozzle N of head 104 based on image forming information and then actinic energy radiation is instantaneously irradiated to the deposited ink from actinic energy radiation source L to cure the ink.

Figure 2B:
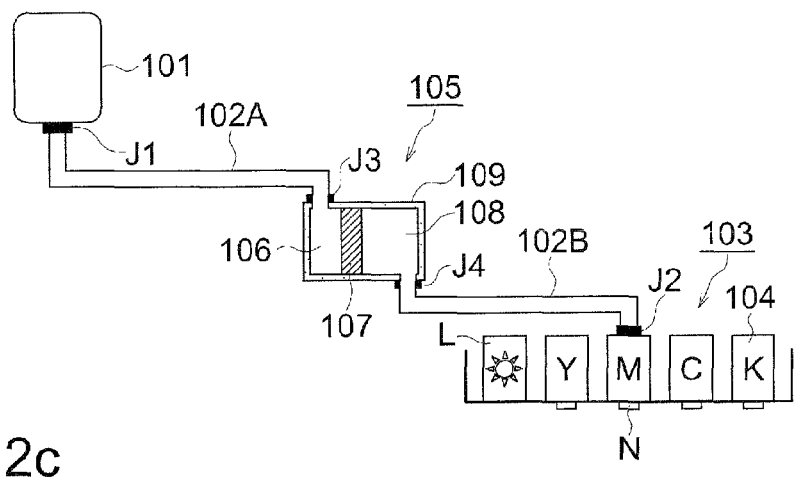

FIG. 2b shows one example in which intermediate tank unit 105 having filter 107 built in is provided halfway in ink supply path 102. The discharge outlet of ink tank 101 is connected to ink supply path 102A via joint J1, which is connected to intermediate unit tank 105 via joint J3. An ink is sent to intermediate tank anterior chamber 106 from the joint J3 portion and then sent to intermediate tank 108 after removal of foreign substances using filter 107.

Subsequently, intermediate tank 108 and ink supply path 102B are connected together via joint J4. Ink supply path 102B is an ink supply line to supply the thus-filtered ink stored in intermediate tank 108 to head 104. Herein, 109 shown in FIG. 2b represents a filter adjacent portion adjacent to filter 107.

Figure 2C:
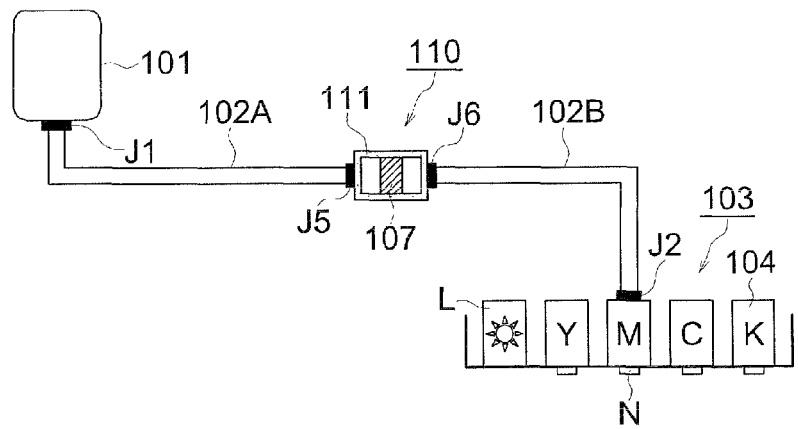

FIG. 2c shows an example in which instead of intermediate tank unit 105 in FIG. 2b, filter box 110 having filter 107 built in is provided. In filter box 110, the ink inlet side is connected to ink supply path 102A via joint J5 and the ink outlet side is connected to ink supply path 102B via joint J6. Foreign substances in the ink are removed by filter 107 arranged in filter box 110 to send the ink to head 104. Herein, 111 shown in FIG. 2c represents a filter adjacent portion adjacent to filter 107.

In FIG. 2 described above, as a matter of convenience, only a line to supply an ink to a magenta ink-jet head is shown. As shown in FIG. 1, similar supply lines are also provided for a yellow ink-jet head, a cyan ink-jet head, and a black ink-jet head. Further, in FIG. 2, a constitution only for description is shown. Therefore, although unshown in FIG. 2, for example, a solenoid valve to control ink sending, a branch joint, and a liquid sending pump, as well as an ink-jet head control section are provided.

The ink-jet printer of the present invention is characterized in that for example, in the ink-jet printer or the ink supply line shown in FIG. 1 or FIG. 2, at least a part of the surface of a metal, preferably the entire surface of the metal, constituting the liquid contact member in contact with an ink-jet ink inside an ink-jet head is subjected to passive treatment or insulating film treatment. Such a metal subjected to passive treatment or insulating film treatment is preferably composed of an alumite-treated aluminum member or an alumite-treated silicon-containing aluminum member.

Next, ink-jet head 2 is described below with reference to FIG. 3-FIG. 6.

Figure 3:
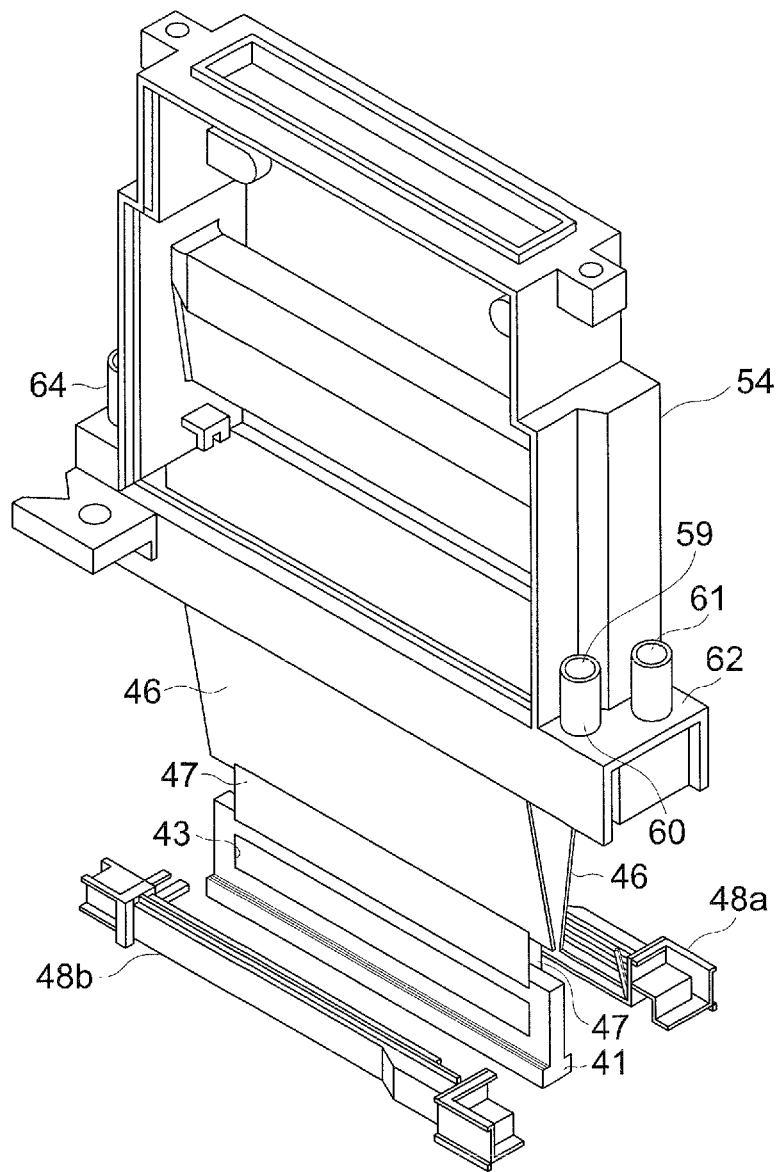
FIG. 3 An exploded perspective view showing one example of an ink-jet head.

FIG. 3 is an exploded perspective view showing ink-jet head 2 of an embodiment of the present invention. As shown in FIG. 3, ink-jet head 2 of this embodiment is provided with 2 stacked ink-jet head tips (hereinafter referred to as "head tips") 41 to eject an ink. Head tips 41 are shaped into an elongate outline. A large number of ejection orifices are arranged in the bottom face (ejection face) thereof. Further, ink supply opening 43 of an almost rectangular shape is provided in the exterior side of each of 2 stacked head tips 41. And ink supply opening 43 is communication-connected to the ejection orifices via an ink flow path (unshown). In a part of the ink flow path, a pressure chamber is formed, having a constitution to eject ink droplets from the ejection orifices based on pressure variation via action of piezoelectric devices. And in head tip 41, 2 head drive boards 46 to send control signals from the control section to each piezoelectric device are each connected to the each piezoelectric device via flexible wiring board 47.

Figure 4:
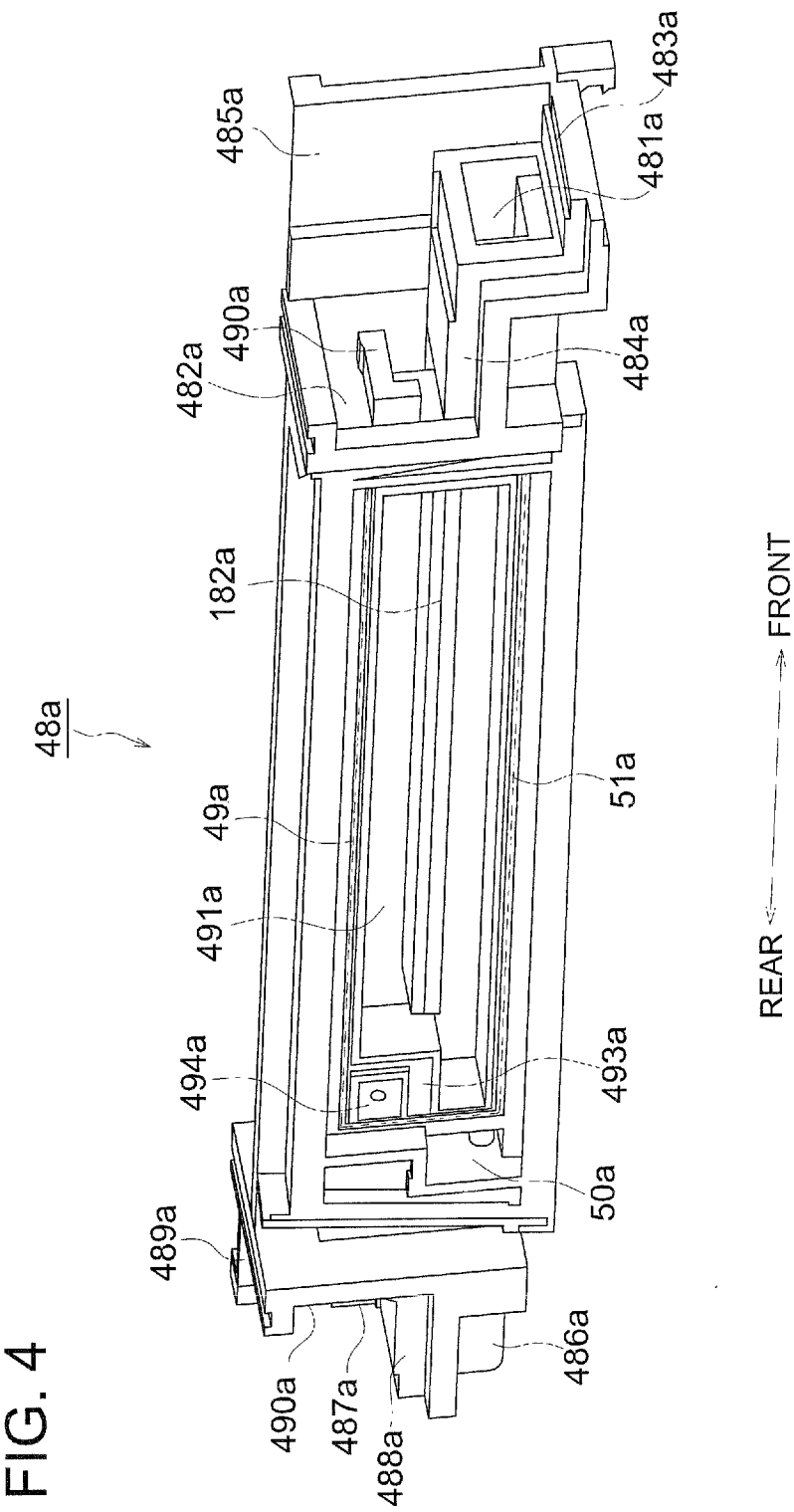
FIG. 4 A perspective view showing one manifold of two manifolds provided for the ink-jet head of FIG. 3.
Figure 5:
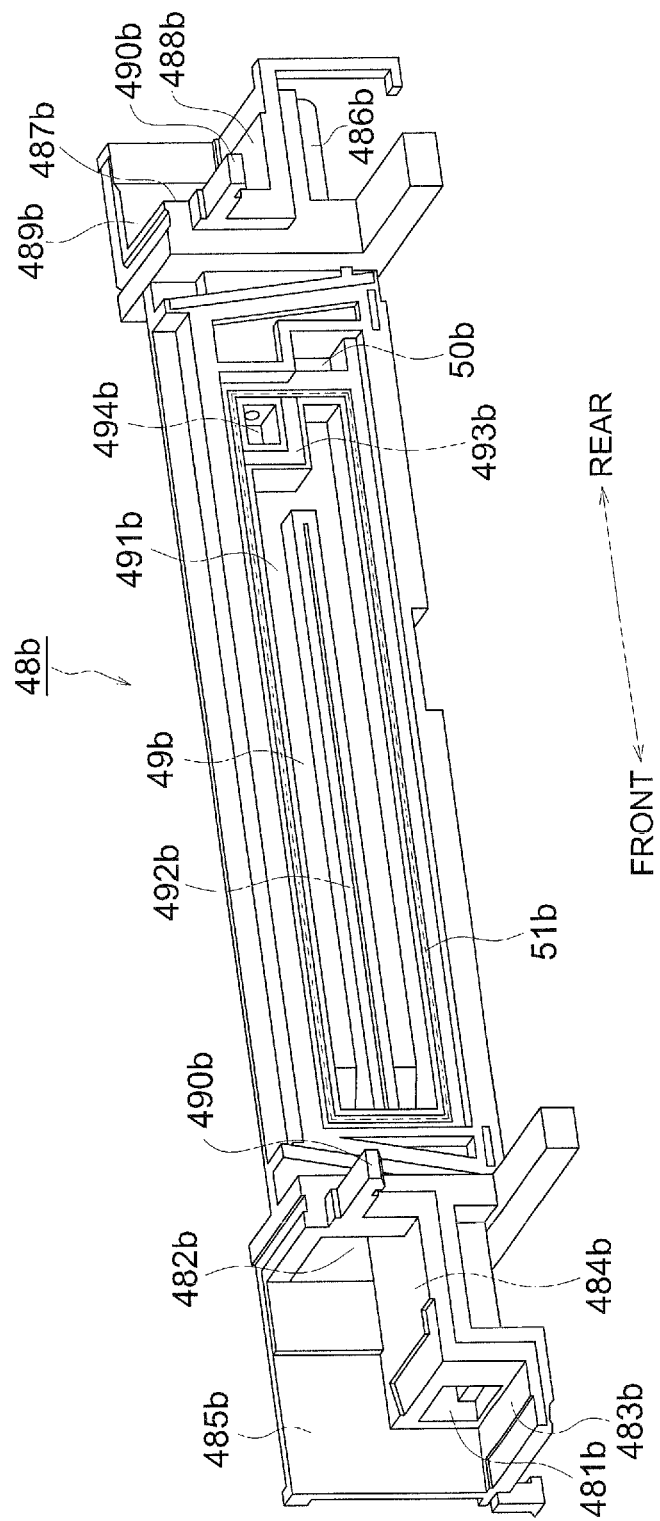
FIG. 5 A perspective view showing the other manifold of the two manifolds provided for the ink-jet head of FIG. 3.

On both sides of 2 head tips 41, 2 manifolds 48a and 48b to supply an ink from the outside to head tips 41 are mounted. FIG. 4 and FIG. 5 each are perspective views of 2 manifolds 48a and 48b. As shown in FIG. 4 and FIG. 5, connection portions 49a and 49b to supply the ink via connection to ink supply opening 43 are provided in the face facing head tips 41 in manifolds 48a and 48b. Connection portions 49a and 49b are outlined almost similarly to the shape of ink supply opening 43. In the interior thereof, first concave portions 491a and 491b serving as ink supply paths are provided. Further, in connection portions 49a and 49b, dividing walls 492a and 492b are horizontally formed in plates to vertically divide first concave portions 491a and 491b and at the same time, to ensure communicative connection of the upper part and the lower part of divided first concave portions 491a and 491b. Further, blocking walls 493a and 493b formed into an L-letter shape are provided in the rear upper part of connection portions 49a and 49b, and second concave portions 494a and 494b are formed to be blocked from first concave portions 491a and 491b by blocking walls 493a and 493b.

Further, in the rear of connection portions 49a and 49b, provided are third concave portions 50a and 50b blocked from first concave portions 491a and 491b and second concave portions 494a and 494b.

In the front end portion of manifolds 48a and 48b, injection openings 481a and 481b are provided to inject an ink into first concave portions 491a and 491b via communicative connection to the lower part of first concave portions 491a and 491b. Above injection openings 481a and 481b, first communicative connection openings 482a and 482b are provided for communicative connection to the upper part of first concave portions 491a and 491b. Injection openings 481a and 481b and first communicative connection openings 482a and 482b are arranged in an anteroposterior manner so as for injection openings 481a and 481b to be located forward. And in the front lower part of injection openings 481a and 481b, almost horizontally provided are ink receiving sections 483a and 483b to receive the ink for guiding to injection openings 481a and 481b. In the front lower part of first communicative connection openings 482a and 482b, first bed sections 484a and 484b of first communicative connection openings 482a and 482b extend almost horizontally. Vertical first side walls 485a and 485b are formed on the opposite side of head tips 41 in first bed sections 484a and 484b and ink receiving sections 483a and 483b.

In the rear end part of manifolds 48a and 48b, cleaning piping arrangements 486a and 486b extending toward the outside are provided to clean the interior of an ink flow path via communicative connection to third concave portions 50a and 50b immediately after setting up ink-jet head 2. Above cleaning piping arrangements 486a and 486b, provided are second communicative connection openings 487a and 487b which are communication-connected to second concave portions 494a and 494b. In the rear lower part of second communicative connection openings 487a and 487b, second bed sections 488a and 488b of second communicative connection openings 487a and 487b extend almost horizontally. Vertical second side walls 489a and 489b are formed on the opposite side of head tips 41 in second bed sections 488a and 488b.

In the front end part of and the rear end part of manifolds 48a and 48b, engaging pieces 490a and 490b are provided to clip and fasten head tips 41. Engaging piece 490a of manifold 48a, being one, and engaging piece 490b of manifold 48b, being the other, are engaged together to mount 2 manifolds 48a and 48b to head tips 41.

In connection portions 49a and 49b of manifolds 48a and 48b, filters 51a and 51b (indicated in dotted lines in FIG. 4 and FIG. 5) are provided to cover first concave portions 491a and 491b and second concave portions 494a and 494b and to make contact with dividing walls 492a and 492b and blocking walls 493a and 493b. When manifolds 48a and 48b have been mounted to head tips 41, filters 51a and 51b cover ink supply opening 43 of head tips 41. Herein, there are spaces 52a and 52b (refer to FIG. 7) between ink supply opening 43 and filters 51a and 51b. Spaces 52a and 52b serve as ink flow paths to introduce an ink having been filtered by filters 51a and 51b to ink supply opening 43.

In the lower part of head tips 41, an unshown holding plate is mounted in order to hold manifolds 48a and 48b and head tips 41 so as for the ejection face to be exposed.

Further, in ink-jet head 2, as shown in FIG. 3, provided is chassis (hereinafter also referred to as "chassis frame") 54 to which components of ink-jet head 2 such as head tips 41, manifolds 48a and 48b, head drive boards 46, and the holding plate as described above are mounted and fastened. Chassis frame 54 is covered with an unshown cover.

Figure 6:
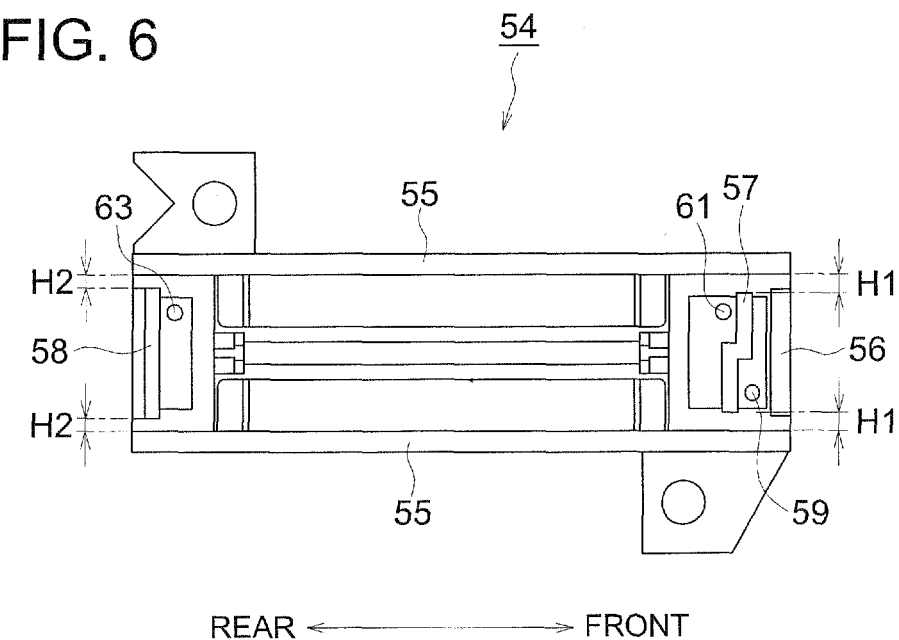
FIG. 6 A bottom view showing a chassis frame provided for the ink-jet head of FIG. 3.

FIG. 6 is a bottom view of chassis frame 54. In the lower end part of chassis frame 54, two side plates 55 are formed to cover both sides of manifolds 48a and 48b. And in the front end part of chassis frame 54, there are provided, between 2 side plates 55, first contact wall 56 in close contact with the front end portion of ink receiving sections 483a and 483b of manifolds 48a and 48b; and second contact wall 57 in close contact with the front end portion of first bed sections 484a and 484b of manifolds 48a and 48b in the rear of first contact wall 56. Gaps H1 are formed between both end portions of first contact wall 56 and second contact wall 57 and side plate 55 so as only for first side walls 485a and 485b of manifolds 48a and 48b to enter. When having entered into gaps H1, first side walls 485a and 485b are brought into close contact with both end portions of first contact wall 56 and second contact wall 57.

Further, in the rear end portion of chassis frame 54, there is provided, between 2 side plates 55, third contact wall 58 in contact with the rear end portions of second bed sections 488a and 488b of manifolds 48a and 48b. Between both end portions of third contact wall 58 and side plates 55, gaps H2 are formed so as only for second side walls 489a and 489b of manifolds 48a and 48b to enter. When having entered into gaps H2, second side walls 489a and 489b are brought into close contact with both end portions of third contact wall 58.

Herein, a space formed by first side walls 485a and 485b and ink receiving sections 483a and 483b of manifolds 48a and 48b, as well as first contact wall 56 and second contact wall 57 is referred to as ink supply space I (refer to FIG. 7), whereby ink supply space I is communication-connected to injection openings 481a and 481b of manifolds 48a and 48b. Further, in chassis frame 54, ink supply flow path 59 is provided to supply an ink to injection openings 481a and 481b via communicative connection to ink supply space I. In this manner, ink supply flow path 59 and injection openings 481a and 481b are connected together via ink supply space I. And ink supply flow path 59 is provided in the front end portion of chassis frame 54 and is communication-connected to ink connection portion 60 of a cylindrical shape connected to ink supply pipe 6.

Further, a space formed by first side walls 485a and 485b and first bed sections 484a and 484b of manifolds 48a and 48b, as well as second contact wall 57 is referred to as first communicative connection space S1 (refer to FIG. 7), whereby first communicative connection space S1 is communication-connected to first communicative connection openings 482a and 482b of manifolds 48a and 48b. First communicative connection flow path 61 is provided in chassis frame 54 to communication-connect the air to first communicative connection openings 482a and 482b via communicative connection to first communicative connection space S1. In this manner, first communicative connection flow path 61 and first communicative connection openings 482a and 482b are connected together via first communicative connection space S1. And first communicative connection flow path 61 is provided in the vicinity of ink connection portion 60 and communication-connected to first pump connection portion 62 of a cylindrical shape connected to a first pump (unshown) to negatively pressurize the interior of manifolds 48a and 48b. In first communicative connection flow path 61, a conventionally known check valve (unshown) is provided to prevent the ink inside the flow path from flowing back to the manifold interior.

Still further, a space formed by second side walls 489a and 489b and second bed sections 488a and 488b of manifolds 48a and 48b, as well as third contact wall 58 is referred to as second communicative connection space S2 (refer to FIG. 7), whereby second communicative connection space S2 is communication-connected to second communicative connection openings 487a and 487b of manifolds 48a and 48b. Second communicative connection flow path 63 is provided in chassis frame 54 to communication-connect the air to second communicative connection openings 487a and 487b via communicative connection to second communicative connection space S2. In this manner, second communicative connection flow path 63 and second communicative connection openings 487a and 487b are connected together via second communicative connection space S2. And second communicative connection flow path 63 is provided in the rear end portion of manifolds 48a and 48b and communication-connected to second pump connection portion 64 of a cylindrical shape connected to a second pump (unshown) to negatively pressurize the interior of manifolds 48a and 48b. In second communicative connection flow path 63, a conventionally known check valve (unshown) is provided to prevent the ink in the flow path from flowing back to the manifold interior.

Figure 7:
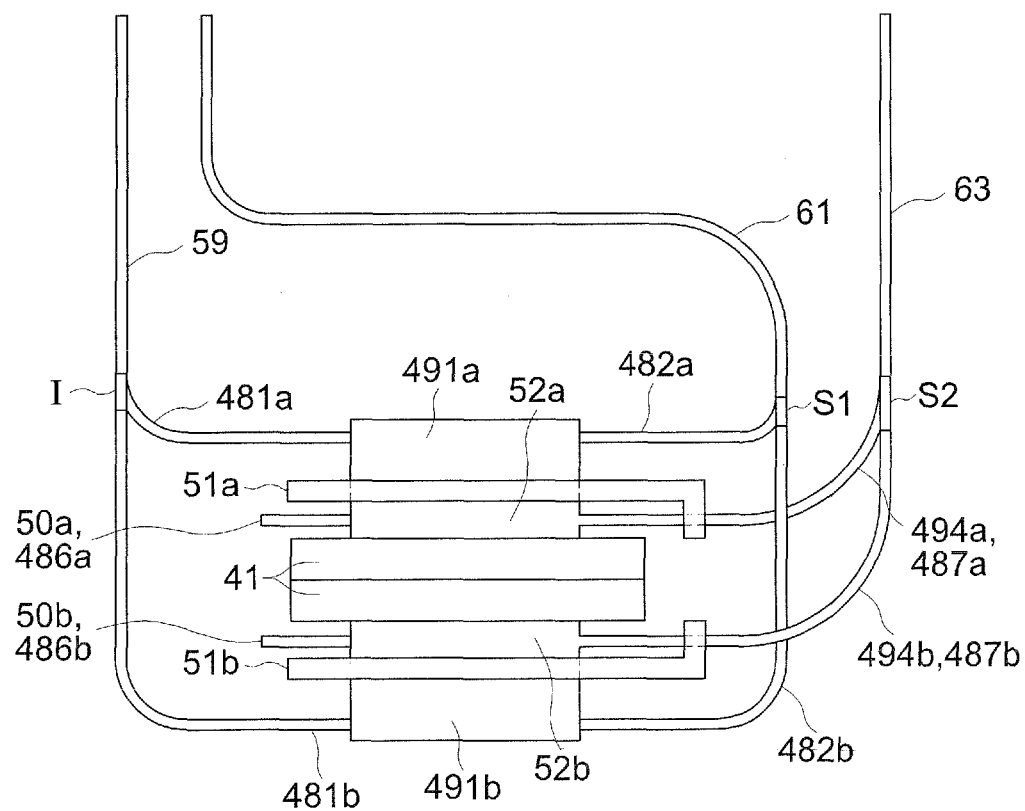
FIG. 7 A schematic view showing an outline of each flow path formed in the ink-jet printer of FIG. 3.

FIG. 7 is a schematic view showing an outline of each flow path formed in ink-jet head 2.

An ink is supplied from ink tank 5 and then the ink flows into ink-jet head 2 via ink supply pipe 6 by initiating the ink supply pump. In ink-jet head 2, initially, the ink passes through ink supply flow path 59 and reaches ink supply space I, and then divergingly enters into injection openings 481a and 481b of manifolds 48a and 48b. During flow of the ink having entered into each of manifolds 48a and 48b from the lower portion to the upper portion of first concave portions 491a and 491b, the ink passes through filters 51a and 51b and flows to spaces 52a and 52b. The ink having reached spaces 52a and 52b enters into head tips 41 from ink supply opening 43. Namely, the ink flow paths in manifolds 48a and 48b are formed so as to reach ink supply opening 43 of head tips 41 from injection openings 481a and 481b via first concave portions 491a and 491b and spaces 52a and 52b. First communicative connection flow path 61 is communication-connected to the upstream side of filters 51a and 51b. Second communicative connection flow path 63 is communication-connected to the downstream side of filters 51a and 51b.

The ink-jet head of the present invention is characterized in that the surface of a metal constituting a liquid contact member in contact with an ink-jet ink inside an ink-jet head is at least partially subjected to passive treatment or insulating film treatment. An ink contact member a part of which is composed of a metal includes the manifold (48), the connection portion (49), the filter (51), and the chassis frame (54).

[Metal]

Metal members constituting the ink-jet head of the present invention include metallic materials, which are also commonly applied to form structural objects. Specifically, there can be used iron, aluminum, zirconium, copper, nickel, tin, zinc, lead, silver, gold, alloys thereof, and alloys employing other metals. Of these, preferable are stainless steel, aluminum, zirconium, copper, and brass. Stainless steel and aluminum are more preferable from the viewpoint of processability, handling properties, and cost.

As stainless steel, ferritic stainless steel and austenitic stainless steel are used. These stainless steels inherently have a Cr/Fe atomic ratio of about 0.7-1.2 on the surface thereof. In the present invention, those allowed to have at least 2.0 for this atomic ratio are used.

[Passive Treatment or Insulating Film Treatment]

Passive treatment referred to in the present invention is treatment for producing a state in which a metal losses its expected chemical reactivity. For example, as soon as iron is immersed in a concentrated nitric acid, the iron becomes hard to dissolve, whereby no copper is precipitated even when the iron is placed in a copper sulfate solution. In this case, the iron is said to become passive.

Specific examples of passive treatment include acid treatment or acid color-generating treatment in which stainless steel is immersed in a concentrated nitric acid or a chromic acid solution; fluorinated passive treatment in which an oxide film on the surface of stainless steel is removed and then fluorine gas treatment is carried out at 265° C. or lower; and $Cr_2O_3$ passive treatment employing chromic acid. Such acid color-generating treatment is desirably carried out using an acid aqueous solution enabling to remove stains, rust, and scale remaining on the stainless steel surface, preferably using a nitric acid solution mainly. Further, of course, any appropriate passive treatment other than the above passive treatments may be carried out.

Passive treatment for aluminum includes alumite treatment and glass coating treatment. Alumite is a material in which aluminum is coated with an anticorrosive oxide film via anodization. The oxide film is mainly composed of $Al_2O_3$, depending on the treatment. And alumite treatment is a method in which aluminum is immersed in oxalic acid, sulfuric acid, or a chromic acid solution and then anodized to have an anticorrosive oxide film coated thereon, being used for building materials and containers. These are technologies to extremely enhance anticorrosive properties and insulating properties of the aluminum surface. In such alumite treatment, sealing treatment is preferably carried out further. This sealing treatment is treatment to seal porous portions. It is said that in hydration sealing of alumite, there is obtained pseudo-boehmite ($\gamma$-Al$_2$O$_3$.$\alpha$H$_2$O) ($\alpha$=1.4-2.0) of an acicular crystal shape intermediate between bayerite ($\gamma$-Al$_2$O$_3$.3H$_2$O) and boehmite ($\gamma$-Al$_2$O$_3$.H$_2$O).

Glass coating treatment is treatment in which sodium silicate, referred to as liquid glass, is sintered on the surface of aluminum and used for reflectance enhancement of luminaires using a technology to dry a concentrated aqueous solution of an alkali silicate obtained by melting silicon dioxide and an alkali on the surface of aluminum.

[Insulating Film Treatment]

As an insulating film treatment, a resin coating treatment is preferably exemplified. As the resin coating treatment, for example, TEFLON (a registered trademark) coating and ceramic coating are preferably listed with no specific limitation. A polyimide (PI) resin, a polyamide-imide (PAI) resin, and an epoxy resin may be used. TEFLON (a registered trademark) coating is specifically preferable.

[Alumite-Treated Aluminum]

In the ink-jet head of the present invention, a metal subjected to a passive treatment or an insulating film treatment is preferably an alumite-treated aluminum member or an alumite-treated silicon-containing aluminum member. An alumite-treated aluminum member according to the present invention will now be described.

Generally, aluminum produces a thin oxide film even on an untreated surface thereof by air oxidation, and thereby is highly resistant to corrosion, compared to iron, being, however, the metal exhibiting relatively low abrasion resistance and low environmental soundness. As a method to improve these properties, an anodization (alumite) treatment is carried out.

The anodization (alumite) of aluminum referred to in the present invention is a method in which aluminum serving as an anode is electrolyzed to form an oxide film having a unique shape on the aluminum surface.

An alumite film obtained via such anodization exhibits excellent adhesion properties and uniformity. The film thickness thereof is determined based on electrolysis conditions and duration. Accordingly, a desired film thickness can be obtained, compared to an electroplating method.

In an anodization (alumite) treatment applied to an aluminum substrate, a substrate composed of aluminum or an aluminum alloy as an anode is generally electrolyzed in an acid bath such as chromic acid, sulfuric acid, boric acid, or sulfamic acid to form an oxide film on the substrate surface.

Treatment conditions for this anodization are not simply specified, since optimum conditions depend on the electrolyte used. Generally, the following ranges are appropriate: the electrolyte concentration is 1-80% by mass; the liquid temperature is 5-70° C.; the current density is 0.5-60 A/dm$^2$; the voltage is 1-100 V; and the electrolysis duration is 10 seconds-10 hours.

Prior to the anodization treatment, an aluminum substrate is preferably subjected to a degreasing treatment via degreasing cleaning methods using various materials such as an acid, an alkali, an organic solvent, and a surfactant. Further, subsequently, the surface thereof is also preferably subjected to etching treatment using an alkali, an acid, or a fluoride.

Various kinds of aluminum alloys can be used for a substrate. For example, used are alloys of a metal such as silicon, copper, manganese, magnesium, chromium, zinc, lead, bismuth, nickel, titanium, or iron with aluminum. In an aluminum substrate used in the present invention, the composition thereof is not specifically limited and those known in the art and commonly used can be employed.

From the viewpoint of processing accuracy of a member, an aluminum alloy having a large content of silicon is more preferable. However, treatment duration for common alumite processing as described above may increase extremely or the surface may become nonuniform.

In the present invention, one of the features is that an aluminum member is an alumite-treated silicon-containing aluminum member. Further, the silicon content is preferably at least 10%, specifically preferably at least 20%.

When an aluminum alloy having such a large content of silicon is subjected to alumite treatment, special alumite processing is required as described in JP-A 2005-113262.

In an alumite-treated aluminum member and an alumite-treated silicon-containing aluminum member according to the present invention, the alumite film thickness of the alumite-treated aluminum member and the alumite-treated silicon-containing aluminum member is preferably at least 9 µm.

The thought that the alumite film thickness of an alumite-treated aluminum member and an alumite-treated silicon-containing aluminum member is at least 9 µm means that an alumite film having a thickness of at least 9 µm is formed on the entire ink contact surface of a member composed of alumite-treated aluminum and any area with no alumite film is produced. However, it is not meant that the alumite film in every area is formed with uniform film thickness in the entire area.

In the present invention, whether or not an alumite film with a predetermined film thickness is formed on the ink contact surface can be confirmed based on a method specified by the present invention.

Namely, an aluminum member as an object to be tested entirely subjected to the alumite treatment is immersed in a test solution of 25° C. prepared by dripping a few drops of a 1% by mass solution of phenolphthalein into a 0.2% by mass solution of NaCl. Subsequently, the alumite-treated aluminum member and a stainless steel plate are arranged as a cathode and an anode, respectively, and then a voltage of 2.0 V is applied for 90 seconds between the electrodes. In the meantime, the presence or absence of bubble generation from the surface of the alumite-treated aluminum member, or occurrence or no occurrence of color change of the test solution is visually observed. When neither bubble generation nor color change of the test solution is noted, it is determined that an alumite film is entirely formed at a film thickness of at least a predetermined one on this alumite-treated aluminum member. On the other hand, when bubble generation or color change (being changed to red) of the test solution is noted, it is indicated that an alumite film formed on the aluminum surface is nonuniform; namely an area of at most a film thickness specified by the present invention exists or an area, in which no alumite film is formed and the alumite substrate is exposed, exists; and then induced electrolysis generates electrolysis gas or formation of aluminum hydroxide shifts the test solution toward the alkali side.

Next, an ink according to the present invention will now be described.

An ink containing a photopolymerizable compound according to the present invention contains a cationically polymerizable composition or a radically polymerizable composition. In the present invention, an ink containing a cationically polymerizable composition is preferably employed.

<<Cationically Polymerizable Composition>>

An ink containing a cationically polymerizable composition according to the present invention contains a cationically curable monomer (a cationically polymerizable compound) and a photopolymerization initiator. Such a cationically curable monomer (a cationically polymerizable compound) preferably contains at least one compound selected from compounds containing an oxetane ring and epoxy compounds, and more preferably contains a vinyl ether compound.

<Compound Containing an Oxetane Ring>

A compound containing an oxetane ring according to the present invention will now be described.

(Oxetane Compound Containing an Oxetane Ring Substituted at the 2-Position)

As a cationically polymerizable composition, an oxetane compound having at least one oxetane ring substituted at the 2-position represented by following Formula (14) in the molecule is preferably used.

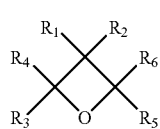

Formula (14)

In Formula (14), $R_1$-$R_6$ each represent a hydrogen atom or a substituent. Herein, at least one group represented by $R_3$-$R_6$ is a substituent. In Formula (14), the substituents represented by $R_1$-$R_6$ represent, for example, a fluorine atom, an alkyl group of a carbon atom number of 1-6 (e.g., a methyl group, ethyl group, propyl group, or butyl group), a fluoroalkyl group of a carbon atom number of 1-6, an allyl group, an aryl group (e.g., a phenyl group or naphthyl group), a furyl group, or a thienyl group. These groups may further have a substituent.

(Oxetane Compound Having One Oxetane Ring in the Molecule)

Further, of those represented by above Formula (14), compounds having any of the oxetane rings represented by following Formulas (15)-(18) are preferably used.

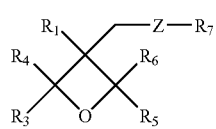

Formula (15)

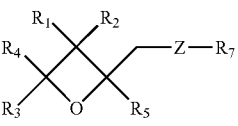

Formula (16)

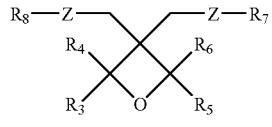

Formula (17)

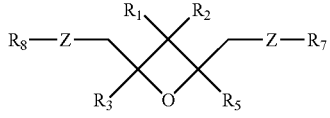

Formula (18)

In the formulas, $R_1$-$R_6$ each represent a hydrogen atom or a substituent; $R_7$ and $R_8$ each represent a substituent; and Z's each are independent, representing an oxygen or sulfur atom, or a divalent hydrocarbon group which may contain an oxygen or sulfur atom in the main chain. The substituents represented by $R_1$-$R_6$ in Formulas (15)-(18) are synonymous with the substituents represented by $R_1$-$R_6$ in Formulas (14).

In Formulas (15)-(18), the substituents represented by $R_7$ and $R_8$ represent an alkyl group of a carbon atom number of 1-6 (such as, a methyl group, ethyl group, propyl group, and butyl group), an alkenyl group of a carbon atom number of 1-6 (such as, a 1-propeny group, 2-propenyl group, 2-methyl-1-propenyl group, 2-methyl-2-propenyl group, 1-butenyl group, 2-butenyl group, and 3-butenyl group), an aryl group (such as, a phenyl group and naphthyl group), an aralkyl group (such as, a benzyl group, fluorobenzyl group, and methoxybenzyl group), an acyl group of a carbon atom number of 1-6 (such as, a propylcarbonyl group, butylcarbonyl group, and pentylcarbonyl group), an alkoxycarbonyl group of a carbon atom number of 1-6 (such as, an ethoxycarbonyl group, propoxycarbonyl group, and butoxycarbonyl group), an alkylcarbamoyl group of a carbon atom number of 1-6 (such as, a propylcarbamoyl group and butylpentyl carbamoyl group), or an alkoxycarbamoyl group (such as, an ethoxycarbamoyl group).

In Formulas (15)-(18), as an oxygen atom or a sulfur atom, or divalent hydrocarbon groups which may contain an oxygen or sulfur atom in the main chain represented by Z in Formulas (15)-(18) include an alkylene group (such as, an ethylene group, trimethylene group, tetramethylene group, propylene group, ethylethylene group, pentamethylene group, hexamethylene group, heptamethylene group, octamethylene group, nonamethylene group, and decamethylene group), an alkenylene group (such as, a vinylene group and propenylene group), and an alkynylene group (such as, an ethynylene group and 3-pentynylene group). Further, the carbon atoms of the above alkylene group, alkenylene group, and alkynylene group may be substituted with an oxygen atom or a sulfur atom.

Of the above substituents, $R_1$ is preferably a lower alkyl group (such as, a methyl group, ethyl group, and propyl group), and an ethyl group is specifically preferably used. Further, as $R_7$ and $R_8$, preferable is a propyl group, a butyl group, a phenyl group, or a benzyl group. Z is preferably a hydrocarbon group (such as, an alkylene group, alkenylene group, and alkynylene group) containing no oxygen or sulfur atom.

(Compound Having at Least 2 Oxetane Rings in the Molecule)

Further, in the present invention, compounds having at least 2 oxetane rings in the molecule as represented by following Formulas (19) and (20) can be used.

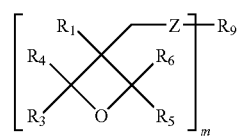

Formula (19)

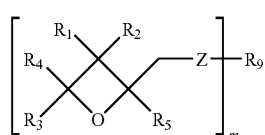

Formula (20)

wherein Z is synonymous with the group referred to in any of above Formulas (15)-(18); m represents 2, 3, or 4; and $R_1$-$R_6$ represent a hydrogen atom, a fluorine atom, an alkyl group of a carbon atom number of 1-6 (e.g., a methyl group, ethyl group, propyl group, or butyl group), a fluoroalkyl group of a carbon atom number of 1-6, an allyl group, an aryl group (e.g., a phenyl group or naphthyl group), or a furyl group. In Formula (19), at least one of $R_3$-$R_6$ is a substituent, and wherein $R_9$ represents a linear or branched alkylene group of a carbon atom number of 1-12, a linear or branched poly(alkyleneoxy) group, or a divalent group selected from the group consisting of those represented by following Formulas (22), (23), and (24).

As one example of the branched alkylene group of a carbon atom number of 1-12, an alkylene group represented by following Formula (21) is preferably used.

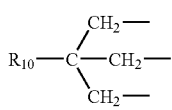

Formula (21)

wherein $R_{10}$ represents a lower alkyl group (e.g., a methyl group, ethyl group, or propyl group).

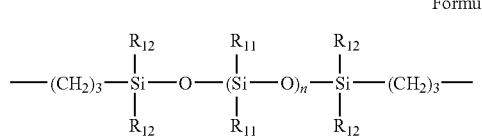

Formula (22)

wherein n represents an integer of 0-2000; $R_{12}$ represents an alkyl group of a carbon atom number of 1-10 (e.g., a methyl group, ethyl group, propyl group, butyl group, pentyl group, hexyl group, heptyl group, octyl group, or nonyl group); and $R_{11}$ represents an alkyl group of a carbon atom number of 1-10 (e.g., a methyl group, ethyl group, propyl group, butyl group, pentyl group, hexyl group, heptyl group, octyl group, or nonyl group) or a group represented by following Formula (25).

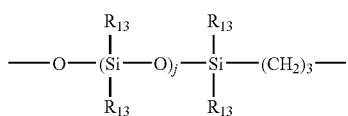

Formula (25)

wherein j represents 0 or an integer of 1-100 and $R_{13}$ represents an alkyl group of a carbon atom number of 1-10 (e.g., a methyl group, ethyl group, propyl group, butyl group, pentyl group, hexyl group, heptyl group, octyl group, or nonyl group).

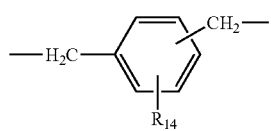

Formula (23)

wherein $R_{14}$ represents a hydrogen atom, an alkyl group of a carbon atom number of 1-10 (e.g., a methyl group, ethyl group, propyl group, butyl group, pentyl group, hexyl group, heptyl group, octyl group, or nonyl group), an alkoxy group of a carbon atom number of 1-10 (e.g., a methoxy group, ethoxy group, propoxy group, butoxy group, or pentoxy group), a halogen atom (e.g., a fluorine atom, chlorine atom, bromine atom, or iodine atom), a nitro group, a cyano group, a mercapto group, an alkoxycarbonyl group (e.g., a methyloxycarbonyl group, ethyloxycarbonyl group, or butyloxycarbonyl group), or a carboxyl group.

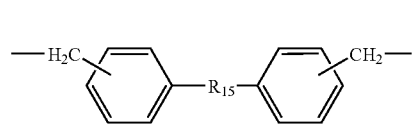

Formula (24)

wherein $R_{15}$ represents an oxygen atom, a sulfur atom, —NH—, —SO—, —$SO_2$—, —($CH_2$)—, —$C(CH_3)_2$—, or —$(CF_3)_2$—.

In an embodiment of a preferable partial structure of a compound having an oxetane ring used in the present invention, for example, $R_1$ in above Formulas (19) and (20) is preferably a lower alkyl group (e.g., a methyl group, ethyl group, or propyl group). An ethyl group is specifically preferable. Further, $R_9$ is preferably a hexamethylene group. Or, those having $R_{14}$ as a hydrogen atom in Formula (23) are preferably used.

In Formula (21), $R_{10}$ is preferably an ethyl group. $R_{12}$ and $R_{13}$ each are preferably a methyl group and Z is preferably a hydrocarbon group containing no oxygen or sulfur atom.

Further, as one example of the preferred embodiments of a compound having an oxetane ring according to the present invention, a compound represented by following Formula (26) is cited.

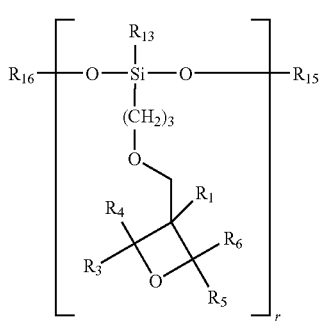

Formula (26)

wherein r represents an integer of 25-200 and $R_{16}$ represents an alkyl group of a carbon atom number of 1-4 (e.g., a methyl group, ethyl group, propyl group, or butyl group) or a trialkylsilyl group. $R_1$, $R_3$, $R_5$, and $R_6$ are synonymous with the substituents represented by $R_1$-$R_6$ in above Formulas (14). Herein, at least one of $R_3$-$R_6$ is a substituent.

Specific examples of a compound having an oxetane ring substituted at the 2-position according to the present invention will now be listed as exemplified compounds 1-15 that by no means limit the scope of the present invention.

1: trans-3-tert-Butyl-2-phenyloxetane
2: 3,3,4,4-Tetramethyl-2,2-diphenyloxetane
3: Di[3-ethyl(2-methoxy-3-oxetanyl)]methyl ether
4: 1,4-Bis(2,3,4,4-tetramethyl-3-ethyl-oxetanyl)butane
5: 1,4-Bis(3-methyl-3-ethyloxetanyl)butane
6: Di(3,4,4-trimethyl-3-ethyloxetanyl)methyl ether
7: 3-(2-Ethyl-hexyloxymethyl)-2,2,3,4-tetramethyloxetane
8: 2-(2-Ethyl-hexyloxy)-2,3,3,4,4-pentamethyl-oxetane 9: 4,4'-Bis[(2,4-dimethyl-3-ethyl-3-oxetanyl)methoxy]biphenyl 10: 1,7-Bis(2,3,3,4,4-pentamethyl-oxatanyl)heptane 11: Oxetanyl silsesquioxane 12: 2-Methoxy-3,3-dimethyloxetane 13: 2,2,3,3-Tetramethyloxetane 14: 2-(4-Methoxyphenyl)-3,3-dimethyloxetane 15: Di(2-(4-methoxyphenyl)-3-methyloxetane-3-yl)ether A compound having an oxetane ring substituted at the 2-position according to the present invention can be synthesized by referring to the literatures listed below.

(1) Hu Xianming and Richard M. Kellogg, Synthesis, 533-538, May (1955)

(2) A. O. Fitton, J. Hill, D. Ejane, and R. Miller, Synth., 12, 1140 (1987)

(3) Toshiro Imai and Sinya Nishida, Can. J. Chem., Vol. 59, 2503-2509 (1981)

(4) Nobujiro Shimizu, Shintaro Yamaoka, and Yuho Tsuno, Bull. Chem. Soc. Jpn., 56, 3853-3854 (1983)

(5) Walter Fisher and Cyril A. Grob, Helv. Chim. Acta., 61, 2336 (1978)

(6) Chem. Ber., 101, 1850 (1968)

(7) "Heterocyclic Compounds with Three- and Four-membered Rings", Part Two, Chapter IX, Interscience Publishers, John Wiley & Sons, New York (1964)

(8) Bull. Chem. Soc. Jpn., 61, 1653 (1988)

(9) Pure Appl. Chem., A29 (10), 915 (1992)

(10) Pure Appl. Chem., A30 (2 & amp; 3), 189 (1993)

(11) JP-A 6-16804

(12) German Patent No. 1,021,858

The content of a compound having an oxetane ring substituted at least at the 2-position according to the present invention in a cationically polymerizable ink is preferably 1-97% by mass, more preferably 30-95% by mass.

(Combined Use of an Oxetane Compound and Another Monomer)

Further, these compounds having an oxetane ring substituted at least at the 2-position according to the present invention may be used individually or 2 types thereof of different structure may be combined. Optionally, combined use with a photopolymerizable monomer or a polymerizable monomer to be described later is possible. In such combination, the mixing ratio of a compound having an oxetane ring substituted at least at the 2-position is preferably adjusted to be 10-98% by mass in a mixture, and the mixing ratio of an added photopolymerizable compound such as a photopolymerizable monomer or polymerizable monomer is preferably adjusted to be 2-90% by mass.

(Oxetane Compounds Having a Substituent Only at the 3-Position)

In the present invention, the above oxetane compound having a substituent at the 2-position and a conventionally known oxetane compound can be used in combination. Of these, an oxetane compound having a substituent only at the 3-position can preferably be used in combination.

Herein, as such an oxetane compound having a substituent only at the 3-position, there can be used those known in the art disclosed in JP-A Nos. 2001-220526 and 2001-310397.

As the oxetane compound having a substituent only at the 3-position, a compound represented by following Formula (24) is cited.

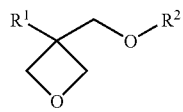

Formula (27)

wherein $R^1$ represents a hydrogen atom, an alkyl group of a carbon atom number of 1-6 such as a methyl group, ethyl group, propyl group, or butyl group, a fluoroalkyl group of a carbon atom number of 1-6, an allyl group, an aryl group, a furyl group, or a thienyl group; and $R^2$ represents an alkyl group of a carbon atom number of 1-6 such as a methyl group, ethyl group, propyl group, or butyl group, an alkenyl group of a carbon atom number of 2-6 such as a 1-propeny group, 2-propenyl group, 2-methyl-1-propenyl group, 2-methyl-2-propenyl group, 1-butenyl group, 2-butenyl group, or 3-butenyl group, an aromatic ring-containing group such as a phenyl group, benzyl group, fluorobenzyl group, methoxybenzyl group, or phenoxyethyl group, an alkylcarbonyl group of a carbon atom number of 2-6 such as an ethylcarbonyl group, propylcarbonyl group, or butylcarbonyl group, an alkoxycarbonyl group of a carbon atom number of 2-6 such as an ethoxycarbonyl group, propoxycarbonyl group, or butoxycarbonyl group, or an N-alkylcarbamoyl group of a carbon atom number of 2-6 such as an ethylcarbamoyl group, propylcarbamoyl group, butylcarbamoyl group, or pentylcarbamoyl group. With regard to an oxetane compound used in the present invention, a compound having one oxetane ring is specifically preferably used from the viewpoint of enhanced adhesion properties and excellent workability due to low viscosity.

As one example of a compound having 2 oxetane rings, a compound represented by following Formula (28) is cited.

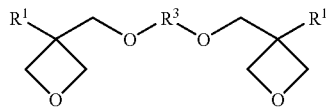

Formula (28)

In Formula (28), $R^1$ represents the same group as in Formula (27); and $R^3$ represents, for example, a linear or branched alkylene group such as an ethylene group, propylene group, or butylene group, a linear or branched poly(alkyleneoxy) group such as a poly(ethyleneoxy) group or poly(propyleneoxy) group, or a linear or branched unsaturated hydrocarbon group such as a propenylene group, methylpropenylene group, or butenylene group; or a carbonyl group, an alkylene group containing a carbonyl group, an alkylene group containing a carboxyl group, or an alkylene group containing a carbamoyl group.

Further, as $R^3$, a multivalent group selected from the groups represented by following Formulas (29), (30), and (31) can be cited.

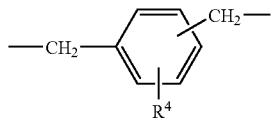

Formula (29)

In Formula (29), $R^4$ represents a hydrogen atom, an alkyl group of a carbon atom number of 1-4 such as a methyl group, ethyl group, propyl group, or butyl group, an alkoxy group of a carbon atom number of 1-4 such as a methoxy group, ethoxy group, propoxy group, or butoxy group, a halogen atom such as a chlorine atom or bromine atom, a nitro group, a cyano group, a mercapto group, a lower alkoxycarbonyl group, a carboxyl group, or a carbamoyl group.

Formula (30)

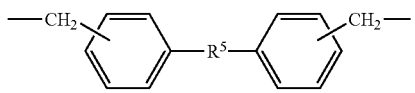

In Formula (30), $R^5$ represents an oxygen atom, a sulfur atom, a methylene group, NH, SO, $SO_2$, $(CF_3)_2$, or $C(CH_3)_2$.

Formula (31)

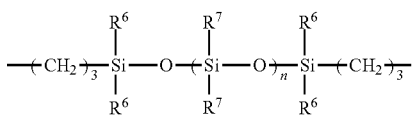

In Formula (31), $R^6$ represents an alkyl group of a carbon atom number of 1-4 such as a methyl group, ethyl group, propyl group, or butyl group, or an aryl group; n represents an integer of 0-2000; and $R^7$ represents an alkyl group of a carbon atom number of 1-4 such as a methyl group, ethyl group, propyl group, or butyl group, or an aryl group and further $R^7$ can include a group selected from a group represented by following Formula (32).

Formula (32)

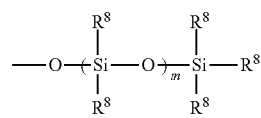

In Formula (32), $R^8$ represents an alkyl group of a carbon atom number of 1-4 such as a methyl group, ethyl group, propyl group, or butyl group, or an aryl group; and m represents an integer of 0-100.

As specific examples of a compound having 2 oxetane rings, the following compounds are listed.

Exemplified compound 1

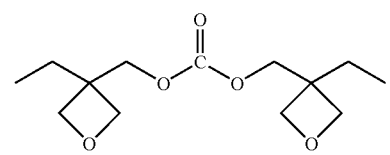

Exemplified compound 2

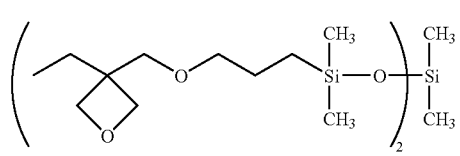

Exemplified compound 1 is a compound wherein $R^1$ is an ethyl group and $R^3$ is a carboxyl group in above Formula (28). And exemplified compound 2 is a compound wherein in Formula (28), $R^1$ is an ethyl group and $R^3$ is a group in which $R^6$ and $R^7$ are a methyl group in above Formula (31); and n is 1.

With regard to the compound having 2 oxetane rings, as a preferred example other than the above compounds, a compound represented by following Formula (33) is cited. In Formula (33), $R^1$ is synonymous with $R^1$ of above Formula (27).

Formula (33)

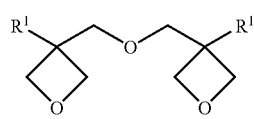

Further, as one example of a compound having 3-4 oxetane rings, a compound represented by following Formula (34) is cited.

Formula (34)

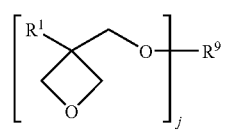

In Formula (34), $R^1$ is synonymous with $R^1$ of above Formula (27). $R^9$ includes, for example, a branched alkylene group of a carbon atom number of 1-12 such as the groups represented by following A-C; a branched poly(alkyleneoxy) group such as the group represented by following D; and a branched polysiloxy group such as the group represented by following E. The designation j represents 3 or 4.

A

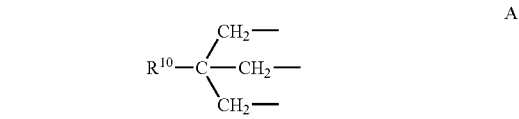

B

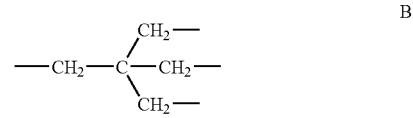

C

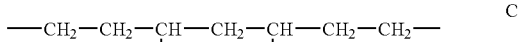

D

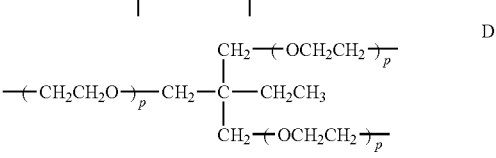

E

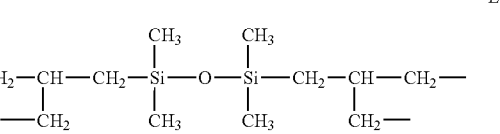

In A, $R^{10}$ represents a lower alkyl group such as a methyl group, ethyl group, or propyl group. And in D, p represents an integer of 1-10.

As one example of a compound having 3 or 4 oxetane rings, exemplified compound 3 is cited.

Exemplified compound 3

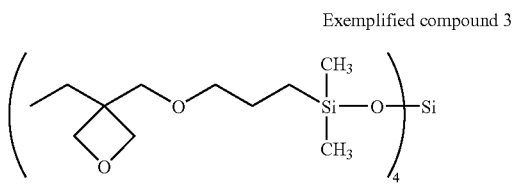

Further, as an example of a compound having 1-4 oxetane rings other than the ones described above, a compound represented by following Formula (35) is cited.

Formula (35)

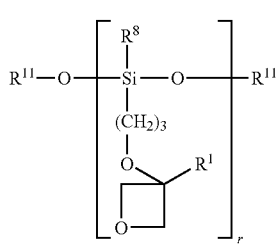

In Formula (35), $R^8$ is synonymous with $R^8$ of above Formula (32). $R^{11}$ represents an alkyl group of a carbon atom number of 1-4 such as a methyl group, ethyl group, propyl group, or butyl group, or a trialkylsilyl group and r represents 1-4.

Preferred specific examples of the oxetane compound of the present invention include exemplified compounds 4, 5, and 6 listed below.

Exemplified compound 4

Exemplified compound 5

Exemplified compound 6

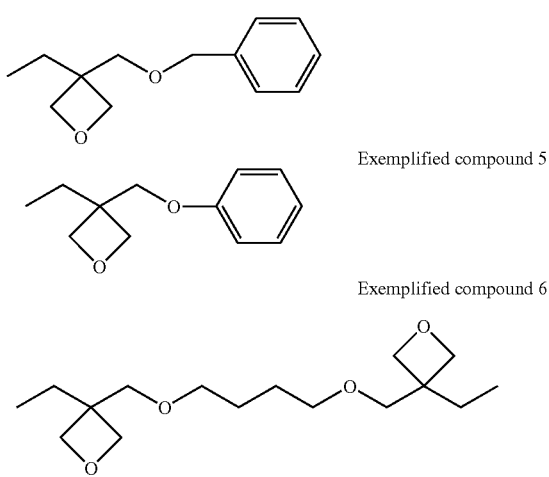

A production method for each of the oxetane ring-containing compound is not specifically limited and it is only necessary to employ any appropriate method conventionally known in the art. For example, there is usable an oxetane ring synthesis method from a diol disclosed by Pattison (D. B. Pattison, J. Am. Chem. Soc., 3455, 79 (1957)). Further, in addition to these, listed are compounds having 1-4 oxetane rings having relatively high molecular weight of a molecular weight of about 1000-5000. As specific examples of these compounds, following exemplified compounds 7, 8, and 9 are cited.

Exemplified compound 7

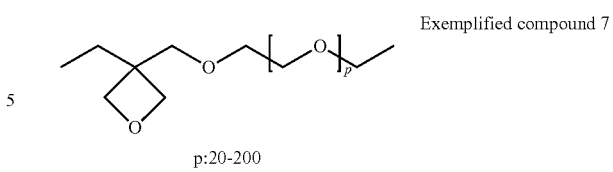

p:20-200

Exemplified compound 8

Exemplified compound 9

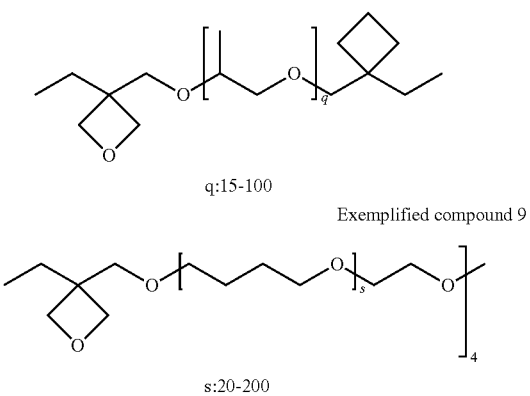

q:15-100 s:20-200

<Epoxy Compounds>

As an epoxy compound according to the present invention, any of a monomer of a compound having an epoxy group and an oligomer thereof can be used. Specifically, a conventionally known aromatic epoxy compound, alicyclic epoxy compound, and aliphatic epoxy compound are listed. Incidentally, hereinafter, such epoxy compounds refer to monomers or oligomers thereof. As an oligomer in the present invention, a compound of lower molecular weight is preferable and an oligomer featuring a molecular weight of less than 1000 is preferable.

Preferable aromatic epoxy compounds are di- or polyglycidyl ethers produced via reaction of polyphenols having at least one aromatic nucleus or alkylene oxide adducts thereof with epichlorohydrin. There are listed, for example, di- or polyglycidyl ethers of bisphenol A or alkylene oxide adducts thereof; di- or polyglycidyl ethers of hydrogenated bisphenol A or alkylene oxide adducts thereof; and novolac-type epoxy resins. Herein, the alkylene oxide includes ethylene oxide and propylene oxide.

As alicyclic epoxy compounds, preferable are cyclohexene oxide- or cyclopentene oxide-containing compounds obtained by epoxidizing compounds having at least one cyclohexene ring or cyclopentene ring using an appropriate oxidant such as hydrogen peroxide or a peracid. Specific examples include compounds listed later.

Preferable aliphatic epoxy compounds include di- or polyglycidyl ethers of aliphatic polyhydric alcohols or alkylene oxide adducts thereof. Typical examples thereof include diglycidyl ethers of alkylene glycols such as diglycidyl ethers of ethylene glycol, diglycidyl ethers of propylene glycol, or diglycidyl ethers of 1,6-hexanediol; polyglycidyl ethers of polyhydric alcohols such as di- or triglycidyl ethers of glycerin or alkylene oxide adducts thereof; and diglycidyl ethers of polyalkylene glycols such as diglycidyl ethers of polyethylene glycol or alkylene oxide adducts thereof or diglycidyl ethers of polypropylene glycol or alkylene oxide adducts thereof. Herein, the alkylene oxide includes ethylene oxide and propylene oxide.

Further, in addition to these compounds, monoglycidyl ethers of aliphatic higher alcohols, being monomers having one oxirane ring in the molecule and monoglycidyl ethers of phenol or cresol can also be used. Of these epoxy compounds, in view of rapid curability, aromatic epoxy compounds and alicyclic epoxy compounds are preferable and the alicyclic epoxy compounds are specifically preferable. In the present invention, the above epoxy compounds may be used individually or at least 2 types thereof may be used in appropriate combination.

Specific examples of such epoxy compounds preferably used in the present invention will now be listed.

EP-1
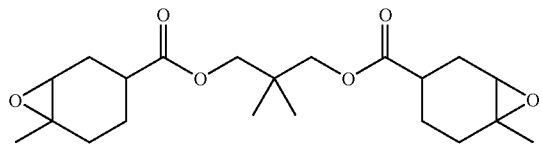

EP-2
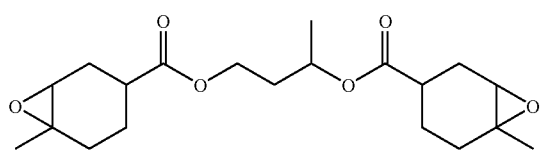

EP-3
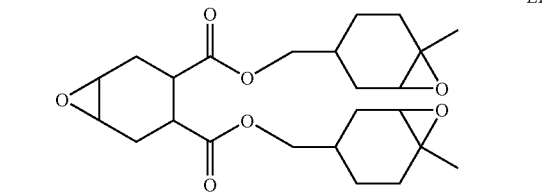

EP-4
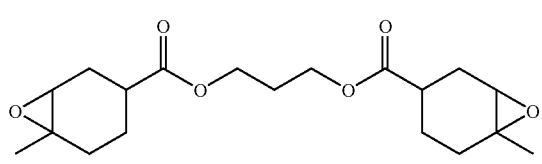

EP-5
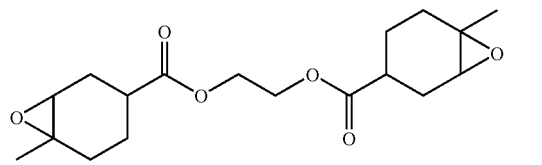

EP-6
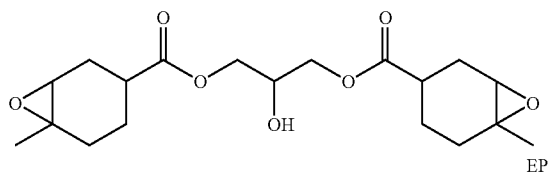

EP-7
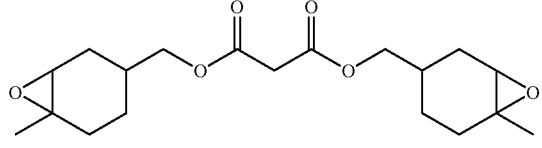

-continued

EP-8
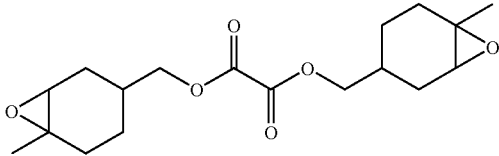

EP-9
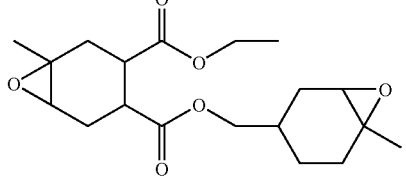

EP-10
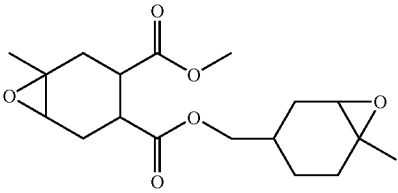

EP-11
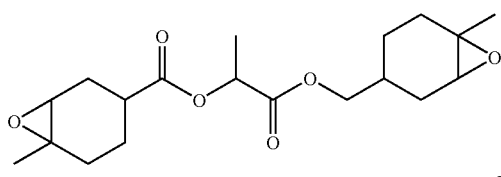

EP-12
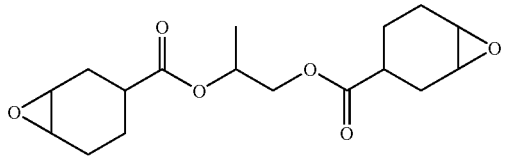

EP-13
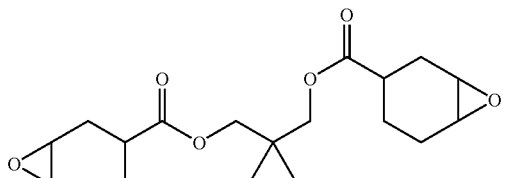

EP-14
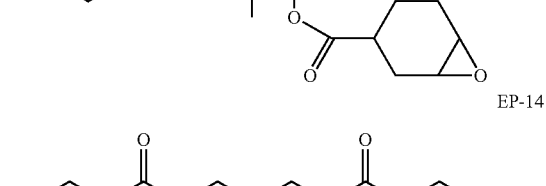

EP-15
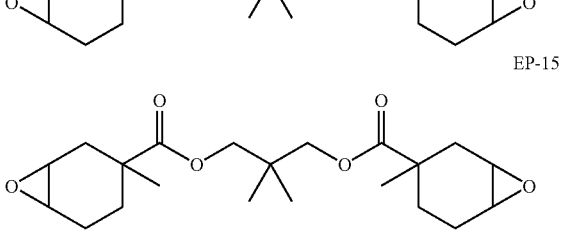

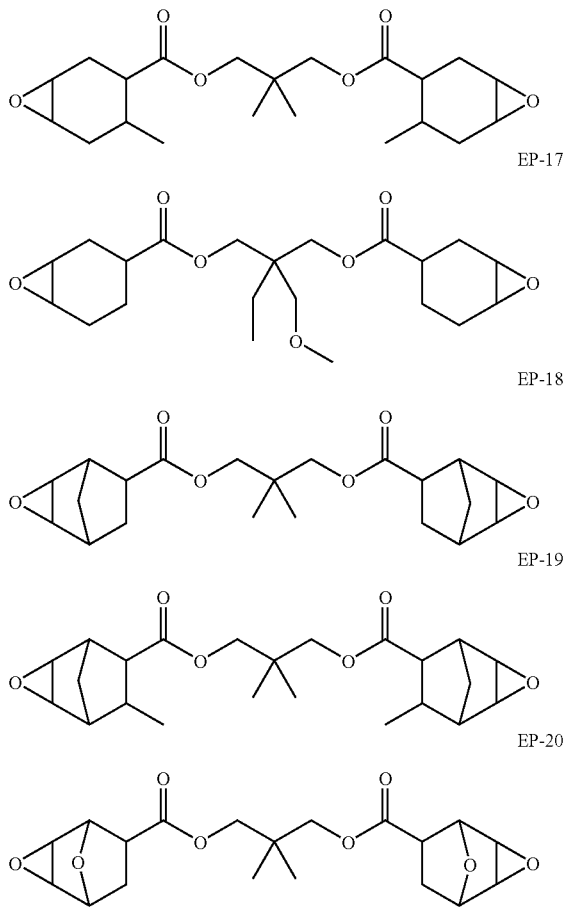

As the amount of an alicyclic epoxy compound added, the content thereof is preferably allowed to be 10-80% by mass. In the case of less than 10% by mass, curability markedly varies with curing ambiences (temperature and humidity), resulting in no practical use. In the case of more than 80% by mass, physical film properties after curing degrades, resulting in no practical use. In the present invention, one type of alicyclic epoxy compound may be used individually or at least 2 types may be used in appropriate combination.

Further, production methods for these alicyclic epoxy compounds are not limited. Synthesis can be carried out with reference to literature documents such as Yuki Gosei II of Dai 4 Han Jikken Kagaku Koza 20 (Organic Synthesis II of 4th Edition Lecture of Experimental Chemistry 20) (page 213-, 1992, published by Maruzen Co., Ltd.); The Chemistry of Heterocyclic Compounds-Small Ring Heterocycles Part 3 Oxiranes, Ed. by Alfred Hasfner, John & Wiley and Sons, An Interscience Publication, New York, 1985; Yoshimura, Set-suchaku (Adhesion) Volume 29, No. 12, 32, 1985; Yoshimura, Setsuchaku (Adhesion) Volume 30, No. 5, 42, 1986; and Yoshimura, Setsuchaku (Adhesion) Volume 30, No. 7, 42, 1986, as well as patent gazettes such as JP-A 11-100378 and Japanese Patent Publication Nos. 2906245 and 2926262.

A cationically polymerizable composition according to the present invention contains an epoxidized fatty acid eater or epoxidized fatty acid glyceride as an epoxy compound.

Such an epoxidized fatty acid eater or epoxidized fatty acid glyceride is preferably used in combination in an oxetane compound/alicyclic epoxy compound system, from the viewpoint of safety and environment such as AMES, sensitizing properties, skin irritating properties, and odor. In addition, there can be overcome conventionally remaining problems such as wrinkle occurrence caused by curing contraction under curing ambiences (temperature and humidity) and failure in curability and ejection performance.

As an epoxidized fatty acid ester or an epoxidized fatty acid glyceride usable for the present invention, those prepared by introducing an epoxy group into a fatty acid ester or a fatty acid glyceride are used with no specific limitation.

Such an epoxidized fatty acid ester is one produced by epoxidizing an oleic acid ester. Methyl epoxystearate, butyl epoxystearate, or octyl epoxystearate is used. Further, an epoxidized fatty acid glyceride is one produced also by epoxidizing soy bean oil, linseed oil, or castor oil. Epoxidized boy bean oil, epoxidized linseed oil, or epoxidized castor oil is used.

<Vinyl Ether Compounds>

Vinyl ether compounds usable for the present invention include, for example, di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, or trimethylolpropane trivinyl ether; and monovinyl ether compounds such as ethyl vinyl ether, butyl vinyl ether, i-butyl vinyl ether, octadecyl vinyl ether, cyclohexyl vinyl ether, hydroxybutyl vinyl ether, 2-ethylhexyl vinyl ether, cyclohexanedimethanol monovinyl ether, propyl vinyl ether, i-propyl vinyl ether, i-propenyl ether-O-propylene carbonate, dodecyl vinyl ether, diethylene glycol monovinyl ether, or octadecyl vinyl ether.

Of these vinyl ether compounds, in view of curability, adhesion properties, and surface hardness, di- or trivinyl ether compounds are preferable. Divinyl ether compounds are specifically preferable. In the present invention, such vinyl ether compounds may be used individually or at least two types thereof may be used in combination.

<<Cationic Polymerization Initiators>>

In a cationically polymerizable ink according to the present invention, an onium salt can be used as a cationic polymerization initiator (also referred to simply as a photopolymerization initiator). Such an onium salt includes a sulfonium salt, an oxonium salt, and an iodonium salt.

As a sulfonium salt used as a cationic polymerization initiator in the present invention, sulfonium salt compounds represented by following Formulas [1]-[4] are preferable.

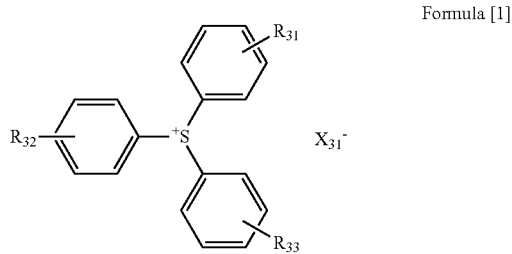

Formula [1]

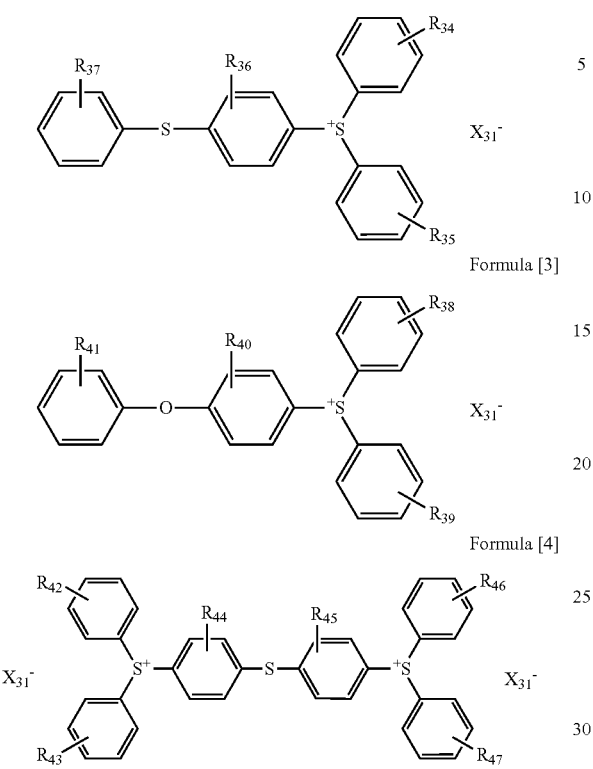

In above Formulas [1]-[4], $R_{31}$-$R_{47}$ each represent a hydrogen atom or a substituent. $R_{31}$-$R_{33}$ do not represent a hydrogen atom simultaneously; $R_{34}$-$R_{37}$ do not represent a hydrogen atom simultaneously; $R_{38}$-$R_{41}$ do not represent a hydrogen atom simultaneously; and $R_{42}$-$R_{47}$ do not represent a hydrogen atom simultaneously.

The substituent represented by $R_{31}$-$R_{47}$ preferably includes an alkyl group such as a methyl group, ethyl group, propyl group, isopropyl group, butyl group, isobutyl group, t-butyl group, pentyl group, or hexyl group; an alkoxy group such as a methoxy group, ethoxy group, propoxy group, butoxy group, hexyloxy group, decyloxy group, or dodecyloxy group; a carbonyl group such as an acetoxy group, propionyloxy group, decylcarbonyloxy group, dodecylcarbonyloxy group, methoxycarbonyl group, ethoxycarbonyl group, or benzoyloxy group; a phenylthio group; a halogen atom such as fluorine, chlorine, bromine, or iodine; a cyano group; a nitro group; and a hydroxyl group.

$X_{31}$ represents a non-nucleophilic anionic residue, including, for example, a halogen atom such as F, Cl, Br, or I, $B(C_6F_5)_4$, $R_{18}COO$, $R_{19}SO_3$, $SbF_6$, $AsF_6$, $PF_6$, and $BF_4$. Herein, $R_{18}$ and $R_{19}$ each represent an alkyl group such as a methyl group, ethyl group, propyl group, or butyl group; and an alkyl group or a phenyl group which can be substituted with a halogen atom such as fluorine, chlorine, bromine, or iodine, a nitro group, a cyano group, or an alkoxy group such as a methoxy group or ethoxy group. Of these, from the viewpoint of safety, $B(C_6F_5)_4$ and $PF_6$ are preferable.

These compounds can readily be synthesized via well-known methods, similarly to the photolytically acid generating agents described in Bulletin of The Chemical Society of Japan, Vol. 71, No. 11, 1998 and Imaging Yo Yuki Zairyo (Organic Materials Used for Imaging Applications) edited by Yuki Electronics Zairyo Kenkyukai published by Bunshin Shuppan (1993).

In the present invention, any of the sulfonium salts represented by above Formulas [1]-[4] is specifically preferably at least one type selected from the sulfonium salts represented by following Formulas [5]-[13]. $X_{31}$ represents a non-nucleophilic anionic residue as described above.

Formula [10]
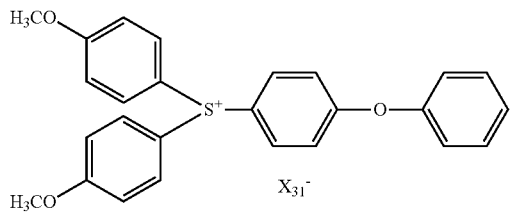

Formula [11]
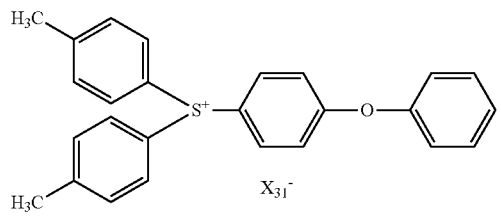

Formula [12]
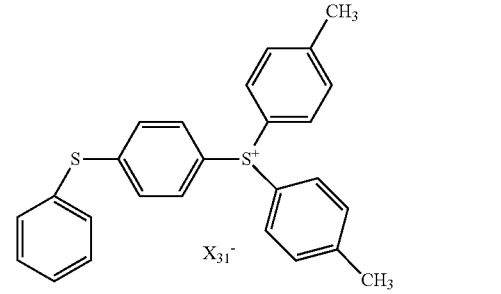

Formula [13]
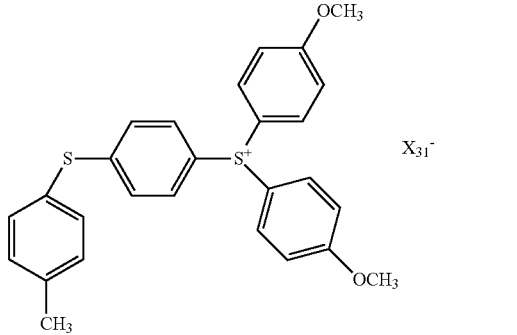

In the present invention, any of the sulfonium salts represented by above Formulas [1]-[4] is specifically preferably at least one type selected from the sulfonium salts represented by Formulas [5]-[13]. X represents a non-nucleophilic anionic residue as described above.

Exemplified compounds, including iodonium salts, include the following compounds in addition to compounds in which X=PF6 in Formulas [5]-[13].

S-1
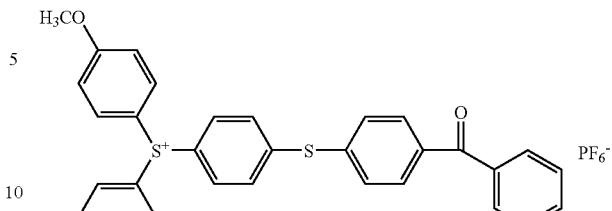

S-2
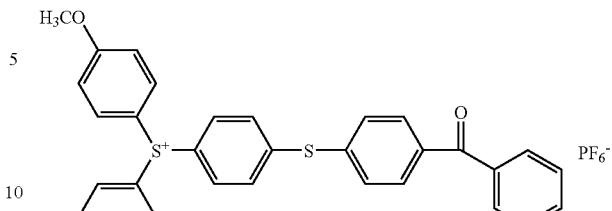

S-3

S-4
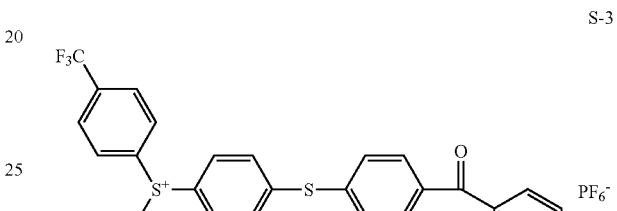

S-5
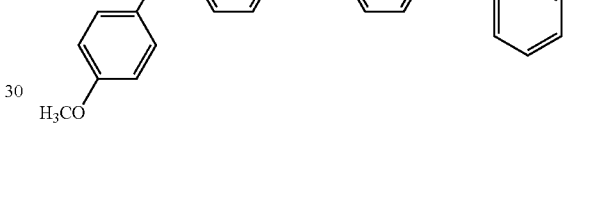

-continued

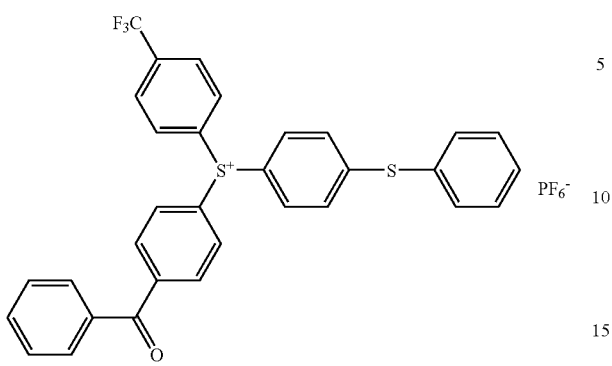
S-6

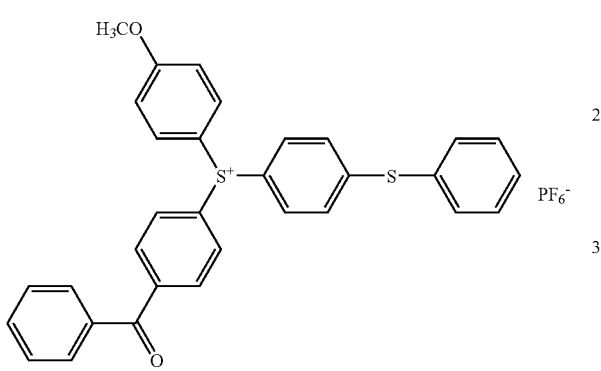
S-7

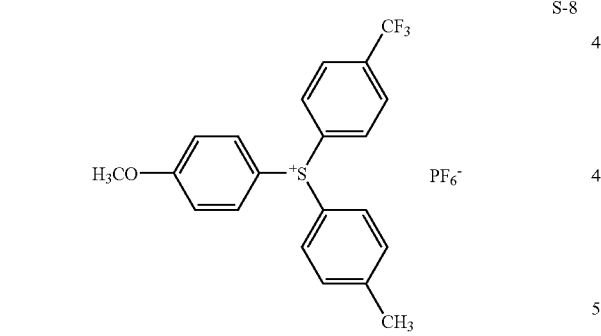
S-8

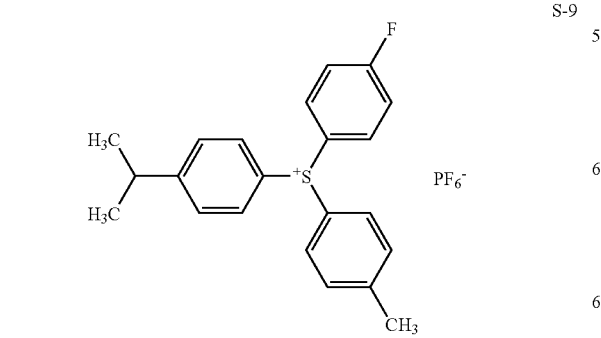
S-9

-continued

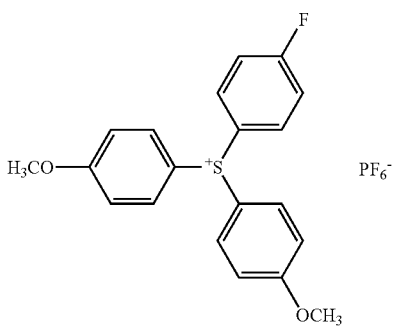
S-10

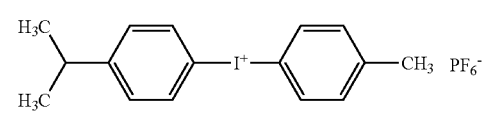
I-1

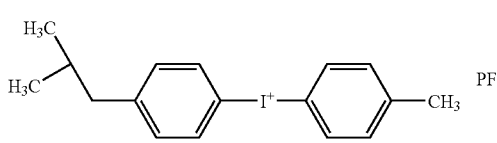
I-2

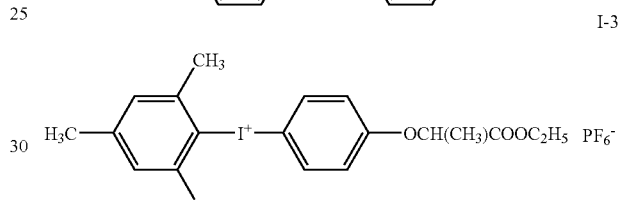
I-3

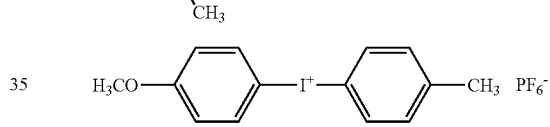
I-4

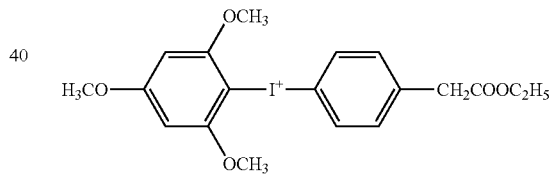
I-5

The cationically polymerizable composition of the present invention preferably contains an onium salt at 1% by mass-less than 5% by mass as a photopolymerization initiator.

<<Radically Polymerizable Composition>>

An ink containing a radically polymerizable composition according to the present invention contains a radically curable monomer (a radically polymerizable monomer) and a photo-radical polymerization initiator as a radically polymerizable composition (an actinic radiation curable composition or a photopolymerizable compound).

<<Radically Polymerizable Monomers>>

A radically polymerizable monomer according to the present invention is a compound having a radically polymerizable ethylenically-unsaturated bond. Any compound having at least one radically polymerizable ethylenically-unsaturated bond in the molecule may be usable, including a chemical form such as a monomer, oligomer, and polymer. Such a radically polymerizable monomer may be used individually, or combined use of at least 2 types at an appropriate ratio is applicable to enhance the targeted characteristics.

Examples of the compound having a radically polymerizable ethylenically-unsaturated bond includes unsaturated acids such as acrylic acid, methacrylic acid, itaconic acid, crotonic acid, isocrotonic acid, or maleic acid; salts, esters, urethanes, amides, and anhydrides thereof; acrylonitrile; and styrene, as well as various types of radically polymerizable compounds such as unsaturated polyesters, unsaturated polyethers, unsaturated polyamides, and unsaturated urethanes. Specifically, there are listed acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, or epoxy acrylate; and methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, or 2,2-bis(4-methacryloxypolyethoxyphenyl)propane, as well as allyl compound derivatives such as allyl glycidyl ether, diallyl phthalate, or triallyl trimellitate. Further, there are usable radically polymerizable and cross-linkable monomers, oligomers, and polymers commercially available or known in the art described, specifically, in "Kakyozai Handbook (Handbook of Crosslinking Agents)," edited by Shinzo Yamashita (1981, Taisei Sha); "UV•EB Kohka Handbook (Genryo Hen) (UV•EB Curing Handbook (Raw Materials Part)," edited by Kiyoshi Kato (1985, Kohbunshi Kankoh Kai); "UV•EB Kohka Gijutsu no Ohyoh to Shijoh (Application and Market of UV•EB Curing Technology)", edited by Rad Tech Japan, page 79 (1989, CMC); and Eiichiroh Takiyama, "Polyester Jushi Handbook (Handbook of Polyester Resins)" (1988, Nikkan Kogyo Shimbun Ltd.). The amount of any of the above radically polymerizable compounds added is preferably 1-97% by mass, more preferably 30-95% by mass.

(Radical Polymerization Initiators)

As radical polymerization initiators, there are listed triazine derivatives described in Examined Japanese Patent Application Publication (hereinafter referred to as JP-B) Nos. 59-1281 and 61-9621 and JP-A 60-60104; organic peroxides described in JP-A Nos. 59-1504 and 61-243807; diazonium compounds described in JP-B Nos. 43-23684, 44-6413, 44-6413, and 47-1604, and U.S. Pat. No. 3,567,453 specification; organic azide compounds described in U.S. Pat. Nos. 2,848,328, 2,852,379, and 2,940,853 specifications; orthoquinonediazides described in JP-B Nos. 36-22062, 37-13109, 38-18015, and 45-9610; various kinds of onium compounds described in JP-B 55-39162, JP-A 59-14023, and "Macromolecules," Vol. 10, page 1307 (1977); azo compounds described in JP-A 59-142205; metal allene complexes described in JP-A 1-54440, European Patent Nos. 109,851 and 126,712, and "J. Imag. Sci.," Vol. 30, page 174 (1986); (oxo)sulfonium organic boron complexes described in JP-A Nos. 4-213861 and 4-255347; titanocenes described in JP-A 61-151197; transition metal complexes containing a transition metal such as ruthenium described in "Coordination Chemistry Review," Vol. 84, pages 85-277 (1988) and JP-A 2-182701; 2,4,5-triarylimidazole dimers and carbon tetrabromide described in JP-A 3-209477; and organic halogen compounds described in JP-A 59-107344. Any of these radical polymerization initiators is preferably contained in the range of 0.01-10 parts by mass, based on 100 parts by mass of a compound having a radically polymerizable ethylenically-unsaturated bond.

<<Colorants>>

An ink containing a photopolymerizable compound according to the present invention preferably contains a pigment as a colorant. Pigments preferably used in the present invention will now be listed:

C.I. Pigment Yellow 1, 3, 12, 13, 14, 17, 42, 74, 81, 83, 87, 93, 95, 109, 120, 128, 138, 139, 151, 166, 180, and 185

C.I. Pigment Orange 16, 36, and 38

C.I. Pigment Red 5, 22, 38, 48:1, 48:2, 48:4, 49:1, 53:1, 57:1, 63:1, 101, 122, 144, 146, 177, and 185

C.I. Pigment Violet 19 and 23

C.I. Pigment Blue 15:1, 15:3, 15:4, 18, 60, 27, and 29

C.I. Pigment Green 7 and 36

C.I. Pigment White 6, 18, and 21

C.I. Pigment Black 7

To disperse the above pigments, employable are various methods such as a ball mill, a sand mill, an atriter, a roll mill, an agitator, a Henschel mixer, a colloid mill, an ultrasonic homogenizer, a pearl mill, a wet-type jet mill, or a paint shaker. As a dispersion medium, photopolymerizable compounds and of these, monomers having the lowest viscosity are preferably selected in view of dispersion adaptability.

In pigment dispersion, the average particle diameter of pigment particles is preferably 0.08-0.5 µm. To realize the maximum particle diameter at 0.3-10 µm, preferably 0.3-3 µm, a pigment, a dispersion agent, and a dispersion medium are appropriately selected and also dispersion and filtration conditions are appropriately set. This particle diameter control makes it possible to inhibit head nozzle clogging and to maintain ink storage stability, ink transparency, and curing sensitivity.

In an actinic radiation curable-type ink according to the present invention, the concentration of a colorant is preferably 1% by mass-10% by mass based on the entire ink amount.

As a pigment dispersion agent, those having a basic anchor portion are preferably used. Further, polymer dispersion agents having a comb-like structure are more preferably used.

Specific examples of such a pigment dispersion agent usable for the present invention include SOLSPERSE 9000, 17000, 18000, 19000, 20000, 24000SC, 24000GR, 28000, and 32000 (produced by Avecia Co.); AJISPER PB821 and PB822 (produced by Ajinomoto-Fine-Techno Co., Inc.); PLAAD ED214 and ED251 and DISPARLON DA-325 and DA-234 (produced by Kusumoto Chemicals Ltd.); and EFKA-5207, 5244, 6220, and 6225 (produced by EFKA Co.). Further, a pigment derivative (a synergist) can be used together with a pigment dispersion agent. Specific examples of such a pigment derivative include SOLSPERSE 5000, 12000, and 22000 (produced by Avecia Co.) and EFKA-6746 and EFKA-6750 (produced by EFKA Co.).

An ink-jet ink according to the present invention preferably employs an actinic radiation curable-type composition and its viscosity is preferably in the range of 10 mPas-less than 50 mPas at 25° C. It is preferable that the viscosity be at least 10 mPas to produce the effects of the present invention, and be less than 50 mPas from the viewpoint of ejection performance.

<<Recording Media>>

As a recording medium used for image formation using the ink-jet printer of the present invention, a wide variety of recording media are usable. From the viewpoint of sufficiently exerting the characteristics of an actinic radiation curable-type ink according to the present invention, recording media practically having no ink absorbability are preferable.

There can be used various non-absorptive plastics and films thereof employed for so-called soft packaging, in addition to common non-coated paper and coated paper. Examples of such various plastic films include polyethylene terephthalate (PET) film, oriented polystyrene (OPS) film, oriented polypropylene (OPP) film, oriented nylon (ONy) film, polyvinyl chloride (PVC) film, polyethylene (PE) film, and triacetyl acetate (TAC) film. As other plastics, polycarbonate, acrylic resins, ABS, polyacetal, polyvinyl alcohol (PVA), and rubber are usable. Metals and glass are also applicable. Of these recording media, when an image is formed specifically on a thermoshrinkable PET film, OPS film, OPP film, ONy film, or PVC film, the constitution of the present invention can be effective. These substrates tend to cause film curling and deformation due to curing contraction of the ink and heat generated during curing reaction, and also the ink film is difficult to conform to substrate contraction.

Surface energies of these various types of plastic films each differ significantly. Consequently, there has been noted such a problem that the dot diameter after ink deposition varies, depending on the recording medium. However, according to the ink of the present invention, it is possible to form excellent highly detailed images on a wide variety of recording media exhibiting a surface energy of 35-60 mN/m, including OPP film and OPS film exhibiting low surface energy and PET exhibiting relatively high surface energy.

In the present invention, from the viewpoint of recording medium cost such as packaging expense and production cost, print production efficiency, and suitability for various print sizes, it is advantageous to use long-length (web) recording media.

<<Image Forming Method>>

An image forming method via the ink-jet recording method of the present invention will now be described.

In an image forming method according to the present invention, preferable is a method wherein the ink described above is ejected and recorded on a recording medium via an ink-jet recording method and then cured via irradiation of actinic radiation such as ultraviolet radiation.

(Total Ink Film Thickness after Ink Deposition)

In the present invention, after deposition of an ink on a recording medium and curing via irradiation of actinic radiation, the total ink film thickness is preferably 2-25 μm. In actinic radiation curable-type ink-jet recording in the screen printing field, at present, the total ink film thickness exceeds 25 μm. In the soft packaging printing field in which thin plastic materials are frequently used as recording media, in addition to the above-mentioned problems such as curling and wrinkling of a recording medium, there are also produced such problems that stiffness and feel of quality of the printed matter as a whole vary. Therefore, ink ejection which results in an excessively thick film is not preferable.

Herein, the term "total ink film thickness" refers to the maximum value of ink film thickness of an image recorded on a recording medium. The meaning of the above total ink film thickness is the same as in cases in which recording is conducted via a single color ink-jet recording method, as well as a 2-color superimposing (secondary color), 3-color superimposing, or 4-color superimposing (white ink base) ink-jet recording method.

(Ink Ejection Conditions)

To ensure ejection stability, with regard to ink ejection conditions, it is preferable to heat an ink-jet head and an ink at 35-100° C. for ejection. An actinic radiation curable-type ink results in a wide variation of viscosity due to the change of temperature. Viscosity variation directly affects the size of droplets and the rate of droplet ejection significantly, resulting in degraded image quality. Accordingly, it is necessary to raise ink temperature and maintain the resulting temperature at a constant value. The control width of the ink temperature falls within a specified temperature of ±5° C., preferably within a specified temperature of ±2° C., more preferably ±1° C. Further, in the present invention, the droplet amount ejected from each nozzle is preferably 2-15 pl.

(Radiation Irradiation Conditions after Ink Deposition)

In the image forming method of the present invention, with regard to actinic radiation irradiation conditions, actinic radiation is irradiated preferably 0.001 second-1.0 second after ink deposition, more preferably 0.001 second-0.5 second thereafter. In order to form highly detailed images, it is specifically critical that irradiation timing is as early as possible.

In the ink-jet recording method of the present invention, radiation irradiation is carried out after deposition of an ink composition onto a recording medium. Radiation irradiation may be visible light irradiation or ultraviolet irradiation. Especially, ultraviolet irradiation is preferable. In ultraviolet irradiation, the amount of ultraviolet irradiation is at least 100 mJ/cm², preferably at least 500 mJ/cm², being at most 10,000 mJ/cm², preferably at most 5,000 mJ/cm². With the amount of ultraviolet irradiation falling within such a range, adequate curing reaction can be performed, and also it is advantageous that discoloring of a colorant via ultraviolet irradiation is prevented. For ultraviolet irradiation, there are listed lamps such as a metal halide lamp, a xenon lamp, a carbon arc lamp, a chemical lamp, a low-pressure mercury lamp, or a high-pressure mercury lamp. For example, commercially available lamps such as an H lamp, a D lamp, or a V lamp (produced by Fusion System Co.) can be used for such irradiation.

A metal halide lamp has a continuous spectrum, compared to a high-pressure mercury lamp (main wavelength: 365 nm), and exhibits enhanced emission efficiency in the range of 200-450 nm being abundant in the long wavelength range. Accordingly, the metal halide lamp is suitable when using a pigment as in the actinic radiation curable-type composition of the present invention.

As an irradiation method of actinic radiation radiation, its basic method is disclosed in JP-A 60-132767. According to this method, a light source is placed on each of both sides of a head unit, and the head and the light sources are scanned via a shuttle method. Irradiation is carried out after the elapse of a predetermined period of time after ink deposition. Then, using another light source independent of driving, curing is completed. U.S. Pat. No. 6,145,979 specification discloses, as irradiation methods, an optical fiber method and a method wherein a collimated light source is directed to a mirror surface placed on the side of a head unit and then UV radiation is irradiated onto a recording section. In the present invention, any of these irradiation methods can be used.

Further, one of the preferred embodiments is also a method wherein irradiation of actinic radiation is divided into 2 steps: initially, actinic radiation is irradiated via the above method 0.001-2.0 seconds after ink deposition; and then actinic radiation is further irradiated after completion of total printing. By dividing actinic radiation irradiation into 2 steps, recording medium contraction generated during ink curing can be prevented further.

Conventionally, in a UV ink-jet system, it has been common that a high illuminance radiation source, whose total power consumption exceeds 1 kW·hr, is used to inhibit dot spreading and bleeding after ink deposition. However, use of such a radiation source have caused an excessively large magnitude of recording medium contraction specifically in shrink label printing, resulting in no practical use at present.

In the present invention, actinic radiation having a maximum illuminance at a wavelength range of 254 nm is preferably used. Thereby, even when a radiation source having a total power consumption of at least 1 kW·hr is used, highly detailed images can be formed and recording medium contraction can fall within the practically allowable level.

(Ink-Jet Printer)

Next, an image forming method using the ink-jet printer of the present invention, the constitution of which has been detailed above, will now be described with reference to drawings.

Figure 8:
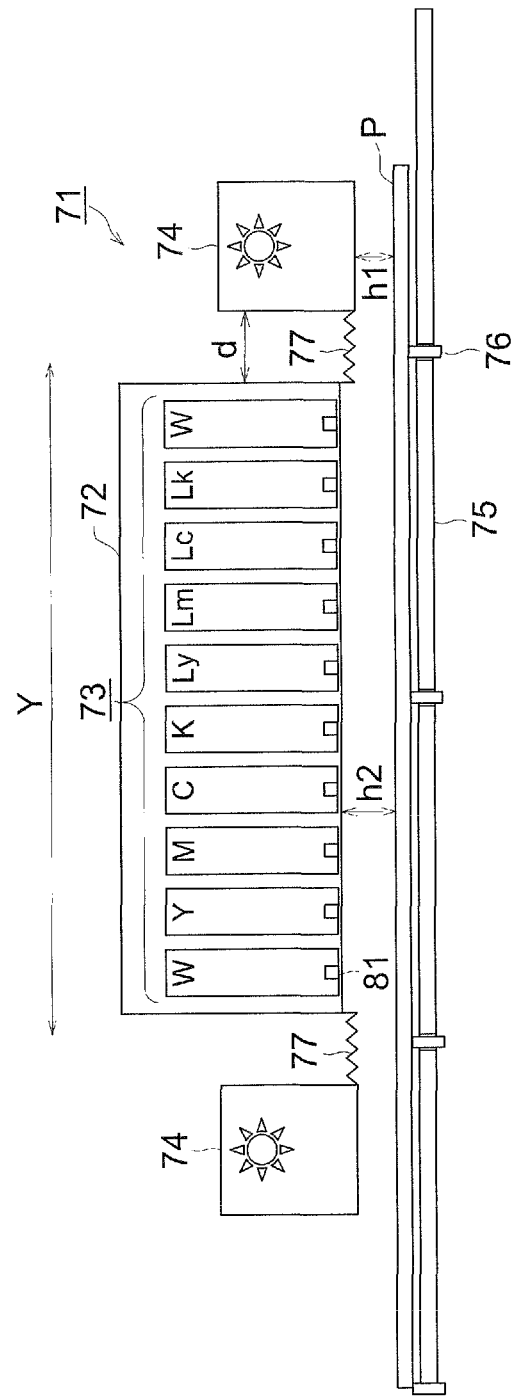
FIG. 8 An elevation view showing an ink-jet head and an irradiation member irradiating actinic radiation in the ink-jet printer of the present invention.

FIG. 8 is, of the ink-jet printers shown in FIG. 1-FIG. 7, an elevation view showing an ink-jet recording head and an irradiation member irradiating actinic radiation.

Recording apparatus 71 is constituted of head carriage 72, ink-jet head 73, irradiation member 74, and platen section 75. In recording apparatus 71, platen section 75 is arranged under recording medium P. Platen section 75 functions to absorb ultraviolet radiation and also absorbs extra ultraviolet radiation having passed through recording medium P. Thereby, highly detailed images can be reproduced remarkably stably.

Recording medium P is guided by guide member 76. Via action of a transportation member (unshown), recording medium P is transported from the front to the rear in FIG. 8. A head scanning member (unshown) allows head carriage 72 to reciprocate in direction Y shown in FIG. 8, whereby scanning of ink-jet head 73 held by head carriage 72 is carried out.

Head carriage 72 is arranged above recording medium P, and a plurality of recording heads 3, to be described later, corresponding to the number of colors used for image printing on recording medium P are housed so that ink ejection orifices 81 are arranged on the lower side. Head carriage 72 is arranged for recording apparatus 71 main body to freely enable reciprocation in direction Y in FIG. 8. Via driving of the head scanning member, reciprocation is made in direction Y in FIG. 8.

Herein, FIG. 8 is drawn so that head carriage 72 houses ink-jet heads 73 for white (W), yellow (Y), magenta (M), cyan (C), black (K), light yellow (Ly), light magenta (Lm), light cyan (Lc), light black (Lk), and white (W). In practice, the number of colors of recording heads 3 housed in head carriage 72 is appropriately determined.

Ink-jet head 73 ejects an actinic radiation curable-type ink (for example, a UV ink) supplied by an ink supply member (unshown) onto recording medium P from ink ejection orifice 8 via action of a plurality of ejection members (unshown) provided inside. The UV ink ejected from ink-jet head 73 is composed of a colorant, a polymerizable monomer, and an initiator, and exhibits such a property that when irradiated with UV radiation, the initiator functions as a catalyst to perform curing of the monomer via cross-linking or polymerization reaction.

Ink-jet head 73 moves from one end of recording medium P to the other end thereof in direction Y in FIG. 8 via driving of a head scanning member. During this scanning, the UV ink is ejected onto a specified area (being a depositable area) of recording medium P in the form of ink droplets and then the ink droplets are deposited onto this depositable area.

The above scanning is carried out at an appropriate number of times to eject the UV ink toward one depositable area. Thereafter, recording medium P is appropriately transported from the front to the rear in FIG. 8 via a transporting member. While scanning using the head scanning member is carried out again, the UV ink is ejected onto a next depositable area adjacent to the above depositable area in the rearward direction in FIG. 8.

The above operation is repeated. And by ejecting the UV ink from ink-jet head 73 under synchronization with the head scanning member and the transporting member, an image is formed on recording medium P.

Irradiation member 74 is composed of a UV lamp which emits ultraviolet radiation having a specified wavelength range at stable exposure energy, and a filter which transmits ultraviolet radiation of a specified wavelength. Herein, applicable UV lamps include mercury lamps, metal halide lamps, excimer lasers, UV lasers, cold-cathode tubes, hot-cathode tubes, blacklights, and LEDs (light emitting diodes). Of these, preferable are band-shaped metal halide lamps, cold-cathode tubes, hot-cathode tubes, mercury lamps, or blacklights. Especially, there are preferable low-pressure mercury lamps, hot-cathode tubes, cold-cathode tubes, and bactericidal lamps emitting ultraviolet radiation of a wavelength of 254 nm in view of efficiently carrying out bleeding prevention and dot diameter control. Irradiation member 74 to cure a UV ink can be produced at low cost by using a blacklight as a radiation source therefor.

Irradiation member 74 is nearly similar in size to the maximum capable of being set by recording apparatus (a UV ink-jet printer) 71 or to be larger in size than the depositable area among the depositable area on which the UV ink is ejected via one scanning of the ink-jet head 73 driven by the head scanning member.

Irradiation member 74 is fix-mounted on both sides of head carriage 72 to become nearly parallel to recording medium P.

As described above, as a method to regulate illuminance of the ink ejection section, of course, ink-jet head 73 is entirely shielded from light. Further, it is effective that distance h1 between irradiation member 74 and recording medium P is set to be smaller than distance h2 between ink ejection orifice 81 of ink-jet head 73 and recording medium P (namely, h1<h2); and also distance d between ink-jet head 73 and irradiation member 74 is set to be far (namely, d is set to be long). It is more preferable that bellows structure 77 is arranged between ink-jet head 73 and irradiation member 4.

Herein, it is possible to appropriately change the wavelength of UV radiation irradiated by irradiation member 74 by replacing a UV lamp or a filter provided for irradiation member 74.

With regard to the ink-jet printer of the present invention, image formation can also be carried out by using a line head-type recording apparatus.

Figure 9:
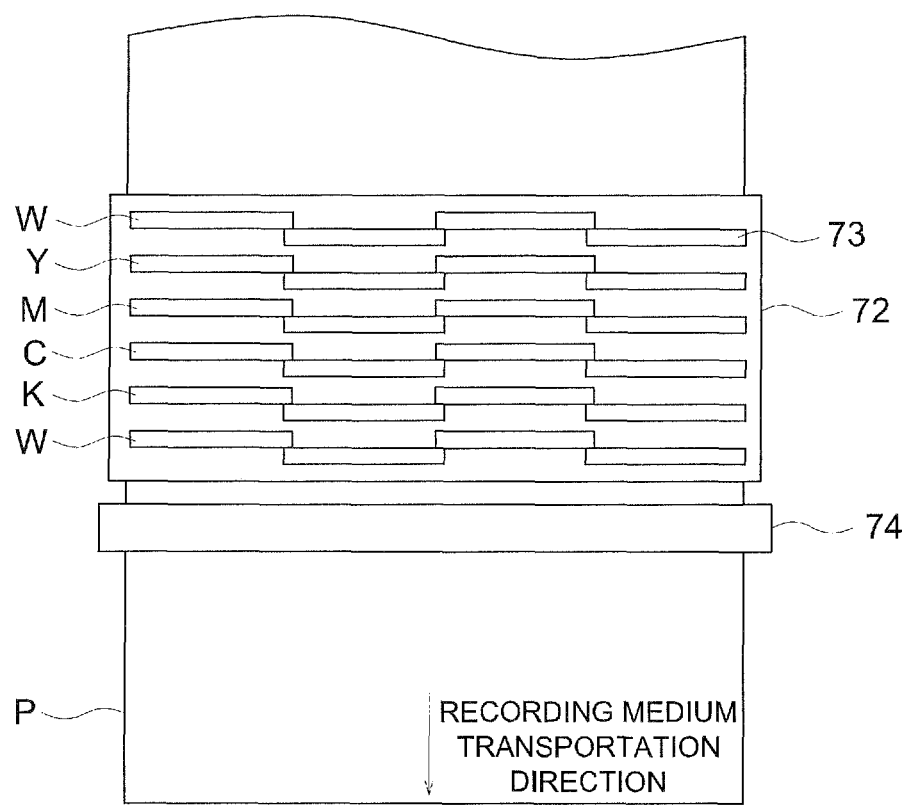
FIG. 9 A top view showing one example of a main part constitution of a line head-system ink-jet recording apparatus.

FIG. 9 is a top view showing one example of a main part constitution of a line head-type ink-jet recording apparatus. The ink-jet recording apparatus shown in FIG. 9 is referred to as a line head system, and a plurality of ink-jet heads 73 of individual colors are fastened and arranged in head carriage 72 to cover the entire width of recording medium P.

On the other hand, on the downstream side of head carriage 72, irradiation member 74 is arranged to cover the entire area of ink printing so that the entire width of recording medium P is similarly covered. As a UV lamp used for irradiation member 74, a UV lamp similar to the one shown in FIG. 8 can be used.

In this line head system, head carriage 72 and irradiation member 74 are fastened and only recording medium P is transported to carry out image formation via ink ejection and curing. Incidentally, in the present invention, recording medium P is preferably warmed at 35-60° C.

EXAMPLES

The present invention will now specifically be described with reference to examples that by no means limit the scope of the present invention. Herein, the designation "part" or "%" in the examples represents "part by mass" or "% by mass" unless otherwise specified.

Example 1

Preparation of Ink

<Cationically Polymerizable Ink>

There were placed 1 part by mass of a dispersion agent (PB822, produced by Ajinomoto Fine-Techno Co., Inc.) and each of the photopolymerizable compounds listed in Table 1 in a stainless steel beaker and then dissolved via stirring and mixing over 1 hour while heated on a hot plate of 65° C. Subsequently, various pigments listed in Table 3 were added to the resulting solution and then the resulting mixture was placed in a poly bottle together with 200 g of zirconia beads of a diameter of 1 mm and tightly sealed, followed by dispersion treatment for 2 hours using a paint shaker. Subsequently, the zirconia beads were removed and various additives such as a photopolymerization initiator, a basic compound, and a surfactant were added in combinations as listed in Table 1. The resulting mixture was filtered by a 0.8 μm membrane filter to prevent printer clogging, whereby a curable composition ink was prepared. Incidentally, ink viscosity was allowed to be 20 mPa·s-30 mPa·s by adjusting the added amount of a compound having an oxetane ring and an epoxy compound to prepare inks 1-5.

TABLE 1

| Ink No. | | Photopolymerizable Compound | | | | | |
|---|---|---|---|---|---|---|---|
| | | Oxetane Ring-containing Compound | | | Vinyl Ether Compound | Oxirane Compound | Photo-Polymerization Initiator | Basic Compound |
| 1 | Compound | | | | DVE-3 | | UVI6992 | *1 |
| | Added Amount (% by mass) | | | | 87.2 | | 5 | 1 |
| 2 | Compound | OXT221 | OXT101 | OXT212 | | CELLOXIDE 2021P | UVI6992 | *1 |
| | Added Amount (% by mass) | 51 | 3 | 7 | | 26.4 | 5 | 1 |
| 3 | Compound | OXT221 | OXT101 | OXT212 | | CELLOXIDE 2021P | S-2 | *1 |
| | Added Amount (% by mass) | 50.8 | 3 | 7 | | 26.4 | 5 | 1 |
| 4 | Compound | OXT221 | OXT101 | OXT212 | | CELLOXIDE 3000 | S-2 | *1 |
| | Added Amount (% by mass) | 50.9 | 3 | 7 | | 26.4 | 5 | 1 |
| 5 | Compound | OXT221 | OXT101 | OXT212 | | EP-1 | CI5102 | *1 |
| | Added Amount (% by mass) | 51 | 3 | 7 | | 26.4 | 5 | 1 |

| Ink No. | | Propylene Carbonate | Silicon-based Surfactant | Dispersion Agent | Water | Pigment | Sensitizer |
|---|---|---|---|---|---|---|---|
| 1 | Compound | propylene carbonate | KF-351 | PB822 | water | each color pigment | DBA |
| | Added Amount (% by mass) | 2 | 0.1 | 1 | 0.2 | 3 | 0.5 |
| 2 | Compound | propylene carbonate | KF-351 | PB822 | water | each color pigment | DBA |
| | Added Amount (% by mass) | 2 | 0.1 | 1 | 0 | 3 | 0.5 |
| 3 | Compound | propylene carbonate | KF-351 | PB822 | water | each color pigment | DBA |
| | Added Amount (% by mass) | 2 | 0.1 | 1 | 0.2 | 3 | 0.5 |
| 4 | Compound | propylene carbonate | KF-351 | PB822 | water | each color pigment | DBA |
| | Added Amount (% by mass) | 2 | 0.1 | 1 | 0.1 | 3 | 0.5 |
| 5 | Compound | propylene carbonate | KF-351 | PB822 | water | each color pigment | DBA |
| | Added Amount (% by mass) | 2 | 0.1 | 1 | 0 | 3 | 0.5 |

*1: Tri-isopropanolamine

<Radically Polymerizable Ink>
Further, radically polymerizable ink 6 was produced using each of the materials listed in Table 2.

TABLE 2

| Ink No. | | Photopolymerizable Compound: Radically Polymerizable Monomer | | | Monofunctional Radical Monomer | *1 | Pigment | Remarks |
|---|---|---|---|---|---|---|---|---|
| 6 | Compound | tetraethylene glycol diacrylate | ε-caprolactam-modified dipentaerythritol hexaacrylate | ethylene oxide-added trimethylolpropane triacrylate | phenoxyethyl methacrylate | IRUGACURE 184 | each color pigment | Inv. |

TABLE 2-continued

| Ink No. | Photopolymerizable Compound: Radically Polymerizable Monomer | | Monofunctional Radical Monomer | *1 | Pigment | Remarks |
|---|---|---|---|---|---|---|
| Added Amount (% by mass) | 30 | 27 | 20 | 10 | 10 | 3 |

*1: Photopolymerization Initiator,
Inv.: present invention

Pigments used for the individually colors are listed in Table 3.

TABLE 3

| | Ink Type | | | |
|---|---|---|---|---|
| | K / Lk | C / Lc | M / Lm | Y / Ly |
| Pigment | Pigment Black 7 (#52, produced by Mitsubishi Chemical Corp.) | Pigment Blue 15:4 (Cyanine Blue 4044, produced by Sanyo Color Works, Ltd.) | Pigment Red 122 (a custom-ordered pigment, produced by Dainichiseika Color & Chemicals Mfg. Co., Ltd.) | Pigment Yellow 150 (E4GN-GT CH20003, produced by Lanxess AG) |

*The pigment concentrations of the light color inks (designated as L) were allowed to be ⅕.

Herein, compounds used for the individual inks are listed below.

<Photopolymerizable Compounds>

OXT101: a photopolymerizable compound, a monofunctional oxetane ring-containing compound, produced by Toagosei Co., Ltd.

OXT212: a photopolymerizable compound, a monofunctional oxetane ring-containing compound, produced by Toagosei Co., Ltd.

OXT221: a photopolymerizable compound, a bifunctional oxetane ring-containing compound, produced by Toagosei Co., Ltd.

DVE-3: a photopolymerizable compound, a vinyl ether compound (produced by JSP Inc.)

CELLOXIDE 2021P: a photopolymerizable compound, a bifunctional oxirane compound (produced by Dicel Chemical Industries, Ltd.)

CELLOXIDE 3000: a photopolymerizable compound, a bifunctional oxirane compound (produced by Dicel Chemical Industries, Ltd.)

EP-1: an exemplified compound, a photopolymerizable compound, an oxirane compound <Photopolymerization Initiators>

UV16992: a photopolymerization initiator, a 50% solution of propion carbonate

S-2: an exemplified compound, a photopolymerization initiator

CI5102: a photopolymerization initiator, an iodonium salt (produced by Nippon Soda Co., Ltd.)

IRUGACURE 184: an iodonium salt (produced by Ciba Specialty Chemicals, Ltd.)

<Other Additives>

KF-351: a silicon-based surfactant, silicone oil (produced by Shin-Etsu Chemical Co., Ltd.)

PB-822; a dispersion agent (produced by Ajinomoto-Fine-Techno Co., Inc.)

DBA: 9,10-dibutoxyanthracene, a sensitizer

<<Ink-Jet Head Materials>>

Of the constituent members of the ink-jet heads shown in FIGS. 3-7, metallic materials were selected for each of the members listed in Table 4 and then printers A-F were prepared using those with or without passive treatment and insulating film treatment (resin coating) for the surface thereof.

TABLE 4

| Printer | Manifold | Connection Portion | Filter | Chassis Frame | Remarks |
|---|---|---|---|---|---|
| A | aluminum | stainless steel | stainless steel | aluminum | comparative |
| B | stainless steel | brass | stainless steel | aluminum | comparative |
| C | alumite-treated aluminum | stainless steel | stainless steel | alumite-treated aluminum | inventive |
| D | alumite-treated aluminum | acid-treated stainless steel | acid-treated stainless steel | alumite-treated aluminum | inventive |
| E | acid-treated stainless steel | acid-treated brass | acid-treated stainless steel | alumite-treated aluminum | inventive |
| F | resin-coated stainless steel | resin-coated brass | resin-coated stainless steel | resin-coated aluminum | inventive |

In the above table, as the metals, aluminum 6061 was used as the aluminum and stainless steel 316 was used as the stainless steel. Alumite-treatment of the aluminum was carried out via hard alumite treatment and then sealing treatment was conducted at an average film thickness of 30 μm. Acid treatment of the stainless steel and the brass were conducted via immersion treatment while stirred in nitric acid of 70% for 3 days. In resin coating, each metal surface was coated with tetrafluoroethylene at a thickness of 50 μm.

<<Evaluation of Precipitation Resistance and Ejection Stability of Ink-Jet Printers>>

(Evaluation of Precipitation Resistance)

Each of the inks prepared above was filled in an ink-jet head of each printer, which was then allowed to be stand with each ink filled therein under an ambience of 23° C. for 3 days. Thereafter, the head was disassembled to determine the presence or absence of precipitates. The results are shown in Table 5.

(Evaluation of Ejection Stability)

The ink-jet head of each printer was filled with each ink and allowed to stand under an ambience of 50° C. for 3 days. Thereafter, multi-size dots of 2-20 pl were ejected with a nozzle number of 256 at a resolution of 720×720 dpi (dpi represents the number of dots per 2.54 cm). The ejection state of the inks of the individual colors was visually observed. Ejection stability was evaluated based on the following criteria.

5: No occurrence of nozzle lack or curved ejection is noted.
4: Curved ejection is slightly noted.
3: No occurrence of nozzle lack is noted but several nozzles causing curved ejection are noted.
2: No nozzle lack exists but multiple occurrences of curved ejection are noted.
1: Apparent nozzle lack and curved ejection occur, resulting in no practical viability.

The thus-obtained results are shown in Tables 5 and 6.

Tables 5 and 6 show that with regard to those wherein the metal of the liquid contact portion inside the head is subjected to passive treatment or insulating film treatment (resin coating treatment), no precipitates are noted and ejection performance is stable.

Especially, inks employing a cationically polymerizable monomer are proved to be effective to a large extent.

Example 2

Preparation of Ink Sets

[Preparation of Pigment Dispersions]
(Preparation of Yellow Pigment Dispersion)

A yellow pigment dispersion was prepared based on the following method.

Two kinds of compounds listed below were placed in a stainless steel beaker and dissolved while heated and stirred on a hot plate at 65° C.

| | |
|---|---|
| AJISPER PB822 (a dispersion agent, produced by Ajinomoto-Fine-Techno Co., Inc.) | 8 parts by mass |
| ARON OXETANE OXT-221 (an oxetane compound, produced by Toagosei Co., Ltd.) | 72 parts by mass |

Subsequently, after cooling to room temperature, 20 parts by mass of C.I. Pigment Yellow 150 (E4GN-GT CH20015, produced by Lanxess AG) was added as a pigment to the resulting solution, followed by being placed in a glass bottle together with 200 parts of zirconia beads of a diameter of 0.3 mm and sealed. Dispersion was carried out using a paint shaker for 4 hours, followed by removal of the zirconia beads to prepare a yellow pigment dispersion.

(Preparation of Magenta Pigment Dispersion)

A magenta pigment dispersion was prepared in the same manner as in preparation of the above yellow pigment dispersion except that as the pigment, C.I. Pigment Yellow 150 was replaced with C.I. Pigment Red 122 (a custom-ordered pigment, produced by Dainichiseika Color & Chemicals Mfg. Co., Ltd.).

(Preparation of Cyan Pigment Dispersion)

A cyan pigment dispersion was prepared in the same manner as in preparation of the yellow pigment dispersion except that as the pigment, C.I. Pigment Yellow 150 was replaced with C.I. Pigment Cyan 15:4 (Cyanine Blue 4044, produced by Sanyo Color Works, Ltd.)

(Preparation of Black Pigment Dispersion)

A black pigment dispersion was prepared in the same manner as in preparation of the yellow pigment dispersion except

TABLE 5

| | Cationic Ink No. | | | | Radical Ink No. | | |
|---|---|---|---|---|---|---|---|
| Printer | 1 | 2 | 3 | 4 | 5 | 6 | Remarks |
| A | presence | presence | presence | presence | presence | presence | comparative |
| B | presence | presence | presence | presence | presence | presence | comparative |
| C | absence | absence | absence | absence | absence | absence | inventive |
| D | absence | absence | absence | absence | absence | absence | inventive |
| E | absence | absence | absence | absence | absence | absence | inventive |
| F | absence | absence | absence | absence | absence | absence | inventive |

TABLE 6

| | Cationic Ink No. | | | | Radical Ink No. | | |
|---|---|---|---|---|---|---|---|
| Printer | 1 | 2 | 3 | 4 | 5 | 6 | Remarks |
| A | 3 | 2 | 1 | 1 | 1 | 3 | comparative |
| B | 4 | 3 | 1 | 2 | 2 | 4 | comparative |
| C | 4 | 4 | 3 | 4 | 4 | 5 | inventive |
| D | 5 | 5 | 5 | 5 | 5 | 5 | inventive |
| E | 5 | 5 | 5 | 5 | 5 | 5 | inventive |
| F | 5 | 5 | 5 | 5 | 5 | 5 | inventive | that as the pigment, C.I. Pigment Yellow 150 was replaced with C.I. Pigment Black 7 (#52, produced by Mitsubishi Chemical Corp.).

[Preparation of Ink Set 1A]

There was prepared ink set 1A incorporating each of following yellow ink Y1, magenta ink M1, cyan ink C1, black ink K1, light yellow ink Ly1, light magenta ink Lm1, light cyan ink Lc1, and light black ink Lk1.

(Preparation of Yellow Ink Y1)

Yellow ink Y1 was prepared using the above-prepared yellow pigment dispersion (containing the yellow pigment: 20% by mass; dispersion agent PB822: 8% by mass; and photopolymerizable compound OXT-221: 72% by mass) and the additives described below.

Specifically, all the following additives, except the yellow pigment dispersion, were mixed and confirmed dissolved sufficiently. Then, this mixed solution was slowly added in the yellow pigment dispersion while stirring and the resulting mixture was stirred for 15 minutes. Thereafter, filtration was carried out using a 3 μm PP disc filter (produced by Roki Techno Co., Ltd.).

| | |
|---|---|
| Yellow Pigment | 3.0 parts by mass |
| Dispersion agent: PB822 (produced by Ajinomoto Fine-Techno Co., Inc.) | 1.0 part by mass |
| Vinyl ether compound: DVE-3 (triethylene glycol divinyl ether, produced by ISP Inc.) | 86.4 parts by mass |
| Photopolymerization initiator: UVI6992 (triphenyl sulfonium salt, produced by Dow Chemicals Co.) | 5.0 parts by mass |
| Polymerization inhibitor (triisopropanolamine) | 0.1 part by mass |
| Propylene carbonate | 2.0 parts by mass |
| Silicon-based surfactant: KF-351 (produced by Shin-Etsu Chemical Co., Ltd.) | 0.1 part by mass |
| Sensitizer: DBA (9,10-dibutoxyanthracene) | 0.5 part by mass |
| Water | 1.0 part by mass |

Subsequently, after preparation of the above ink liquid, the surface tension thereof was adjusted to be 27 mN/m at 25° C., followed by degassing using a degassing module employing a hollow fiber membrane (SEPAREL PF-004D, produced by DIC Corp.) to prepare yellow ink Y1 of a pigment concentration of 3.0% by mass.

(Preparation of Magenta Ink M1, Cyan Ink C1, and Black Ink K1)

Magenta ink M1, cyan ink C1, and black ink K1 of a pigment concentration of 3.0% by mass were prepared in the same manner as in preparation of above yellow ink Y1 except that the yellow pigment dispersion was replaced each with the magenta pigment dispersion, the cyan pigment dispersion, and the black pigment dispersion.

(Preparation of Light Yellow Ink Ly1, Light Magenta Ink Lm1, Light Cyan Ink Lc1, and Light Black Ink Lk1)

Light yellow ink Ly1, light magenta ink Lm1, light cyan ink Lc1, and light black ink Lk1 were prepared in the same manner as in preparation of above yellow ink Y1, magenta ink M1, cyan ink C1, and black ink K1 except that each of the pigment concentrations was changed to 0.6% by mass.

[Preparation of Ink Set 2A]

There was prepared ink set 2A incorporating each of following yellow ink Y2, magenta ink M2, cyan ink C2, black ink K2, light yellow ink Ly2, light magenta ink Lm2, light cyan ink Lc2, and light black ink Lk2.

(Preparation of Yellow Ink Y2)

Yellow ink Y2 was prepared using the above-prepared yellow pigment dispersion (containing the yellow pigment: 20% by mass; dispersion agent PB822: 8% by mass; and photopolymerizable compound OXT-221: 72% by mass) and the additives described below.

Specifically, all the following additives, except the yellow pigment dispersion, were mixed and confirmed dissolved sufficiently. Then, this mixed solution was slowly added in the yellow pigment dispersion while stirring and the resulting mixture was stirred for 15 minutes. Thereafter, filtration was carried out using a 3 μm PP disc filter (produced by Roki Techno Co., Ltd.).

| | |
|---|---|
| Yellow Pigment | 3.0 parts by mass |
| Dispersion agent: PB822 (produced by Ajinomoto Fine-Techno Co., Inc.) | 1.0 part by mass |
| Oxetane ring-containing compound: Oxetane OXT221 (a bifunctional compound, produced by Toagosei Co., Ltd.) | 50.0 parts by mass |
| Oxetane ring-containing compound: Oxetane OXT212 (a monofunctional compound, produced by Toagosei Co., Ltd.) | 7.0 parts by mass |
| Oxetane ring-containing compound: Oxetane OXT101 (a monofunctional compound, produced by Toagosei Co., Ltd.) | 3.0 parts by mass |
| Alicyclic epoxy compound: CELLOXIDE 2021P (a bifunctional compound, produced by Dicel Chemical Industries, Ltd.) | 26.4 parts by mass |
| Polymerization initiator: exemplified compound S-2 | 5.0 parts by mass |
| Polymerization inhibitor (triisopropanolamine) | 0.1 part by mass |
| Propylene carbonate | 2.0 parts by mass |
| Silicon-based surfactant: KF-351 (produced by Shin-Etsu Chemical Co., Ltd.) | 0.1 part by mass |
| Sensitizer: DBA (9,10-dibutoxyanthracene) | 0.5 part by mass |
| Water | 0.6 part by mass |

Subsequently, after preparation of the above ink liquid, the surface tension thereof was adjusted to be 27 mN/m at 25° C., followed by degassing using a degassing module employing a hollow fiber membrane (SEPAREL PF-004D, produced by DIC Corp.) to prepare yellow ink Y2 of a pigment concentration of 3.0% by mass.

(Preparation of Magenta Ink M2, Cyan Ink C2, and Black Ink K2)

Magenta ink M2, cyan ink C2, and black ink K2 of a pigment concentration of 3.0% by mass were prepared in the same manner as in preparation of above yellow ink Y2 except that the yellow pigment dispersion was replaced each with the magenta pigment dispersion, the cyan pigment dispersion, and the black pigment dispersion.

(Preparation of Light Yellow Ink Ly2, Light Magenta Ink Lm2, Light Cyan Ink Lc2, and Light Black Ink Lk2)

Light yellow ink Ly2, light magenta ink Lm2, light cyan ink Lc2, and light black ink Lk2 were prepared in the same manner as in preparation of yellow ink Y2, magenta ink M2, cyan ink C2, and black ink K2 except that each of the pigment concentrations was changed to 0.6% by mass.

[Preparation of Ink Set 3A]

Ink set 3A was prepared in the same manner as in preparation of above ink set 2A except that the type of each of the additives and the added amount thereof were changed as listed in Table 7.

TABLE 7

| Ink Set No. | Cationically Polymerizable Monomer | | | | *3 | | Photo-polymerization Initiator | | Basic Compound TPA | PC | Silicon-based Surfactant KF-351 | Dispersion Agent PB822 | Water | Pigment | Sensitizer DBA |
|---|---|---|---|---|---|---|---|---|---|---|---|---|---|---|---|
| | OXT 221 *1 | OXT 101 | OXT 212 | DVE-3 *2 | Type | Added Amount (part) | Type | Added Amount (part) | | | | | | | |
| 1 | — | — | — | 86.4 | — | — | UVI6992 | 5 | 1 | 2 | 0.1 | 1 | 1 | *4 | 0.5 |
| 2 | 50 | 3 | 7 | — | S2021P | 26.4 | S-2 | 5 | 1 | 2 | 0.1 | 1 | 1 | *4 | 0.5 |
| 3 | 50 | 3 | 7 | — | EP-1 | 26.4 | CI5102 | 5 | 1 | 2 | 0.1 | 1 | 1 | *4 | 0.5 |

*1: Oxetane ring-containing compound
*2: Vinyl ether compound
*3: Alicyclic epoxy compound
*4: Dark ink = 3 parts by mass; and light ink = 0.6 part by mass Herein, the detail of each of the compounds abbreviated in Table 7 is listed below. And the numeric values listed in Table 7 are expressed in parts by mass.

(Cationically Polymerizable Monomers)
<Oxetane Ring-Containing Compounds>
OXT221: Oxetane OXT221 (a bifunctional compound, produced by Toagosei Co., Ltd.)
OXT101: Oxetane OXT101 (a monofunctional compound, produced by Toagosei Co., Ltd.)
OXT212: Oxetane OXT212 (a monofunctional compound, produced by Toagosei Co., Ltd.)
<Vinyl Ether Compound>
DVE-3: triethylene glycol divinyl ether (produced by ISP Inc.)
<Alicyclic Epoxy Compound>
S2021P: CELLOXIDE 2021P (a bifunctional compound, produced by Dicel Chemical Industries, Ltd.)
EP-1: exemplified compound EP-1
(Photopolymerization Initiator)
UVI6992: triphenyl sulfonium salt (produced by Dow Chemicals Co.)
S-2: exemplified compound S-2
CI5102: an iodonium salt (produced by Nippon Soda Co., Ltd.)
(Basic Compound)
TPA: triisopropanolamine
(Surfactant)
KF-351: a silicon-based surfactant (produced by Shin-Etsu Chemical Co., Ltd.)
(Dispersion Agent)
PB-822: a polymer dispersion agent (produced by Ajinomoto-Fine-Techno Co., Inc.)
(Sensitizer)
DBA: 9,10-dibutoxyanthracene
(Other Compounds)
PC: propylene carbonate
<<Ink-Jet Printers>>
[Ink-Jet Printer 1]

The ink-jet printer having an ink supply line shown in FIG. 2b was used. Ink tank 101 and joints J1-J4 were produced using SUS316 (stainless steel: chromium 18%, nickel 12%, and molybdenum 2.5%). For ink supply paths 102A and 102B, used was an ink-resistant TEFLON (a trademark) tube which was en insulating member having a thermal conductivity of 0.2 W/m·k and this tube was coated with a black polyolefin tube. Further, as the ink-jet head, an ink-jet head featuring the constitution shown in FIG. 3 was used.

Intermediate unit tank 105, the manifold section shown in FIG. 3 (manifolds 48a and 48b shown in FIG. 3), and the ink-jet head interior were also produced using SUS 316.

Intermediate unit tank 105, the manifold section, and the ink-jet head were mounted with a heating member and heated from the outside at 50° C.

[Production of Ink-Jet Printers 2-30]

Ink-jet printers 2-25 were produced in the same manner as in production of ink-jet printer 1 except that the members constituting the intermediate unit tank, the manifold section (manifolds 48a and 48b shown in FIG. 3), and the ink contact portion of the ink-jet head were changed as listed in Table 8.

TABLE 8

| Ink-jet Printer No. | Constituent Member | | |
|---|---|---|---|
| | Intermediate Unit Tank Member | Manifold Member | Recording Head Member |
| 1 | SUS316 | SUS316 | SUS316 |
| 2 | SUS316 | A310MX04 | SUS316 |
| 3 | SUS316 | AL2011 | SUS316 |
| 4 | SUS316 | AL4032 | SUS316 |
| 5 | SUS316 | DISPAL | SUS316 |
| 6 | SUS316 | Alumite 1 | SUS316 |
| 7 | SUS316 | Alumite 2 | SUS316 |
| 8 | SUS316 | Alumite 3 | SUS316 |
| 9 | SUS316 | Alumite 4 | SUS316 |
| 10 | SUS316 | Alumite 5 | SUS316 |
| 11 | SUS316 | SUS316 | AL2011 |
| 12 | SUS316 | SUS316 | AL4032 |
| 13 | SUS316 | SUS316 | DISPAL |
| 14 | SUS316 | SUS316 | Alumite 2 |
| 15 | SUS316 | SUS316 | Alumite 4 |
| 16 | SUS316 | SUS316 | Alumite 5 |
| 17 | A310MX04 | A310MX04 | A310MX04 |
| 18 | AL2011 | AL2011 | AL2011 |
| 19 | AL4032 | AL4032 | AL4032 |
| 20 | DISPAL | DISPAL | DISPAL |
| 21 | Alumite 1 | Alumite 1 | Alumite 1 |
| 22 | Alumite 2 | Alumite 2 | Alumite 2 |
| 23 | Alumite 3 | Alumite 3 | Alumite 3 |
| 24 | Alumite 4 | Alumite 4 | Alumite 4 |
| 25 | Alumite 5 | Alumite 5 | Alumite 5 |

Herein, the detail of each of the constituent members abbreviated in Table 8 is as follows:

SUS316: stainless steel (chromium 18%, nickel 12%, and molybdenum 2.5%)

A310MX04: a thermoplastic resin (thermal conductivity: 0.2 W/m·k and volume resistivity: $1 \times 10^{16}$ Ω·cm, produced by Toray Industries, Inc.)

AL2011: Aluminum Alloy 2011 (Si content: at most 0.4%; and Cu content: 5-6%)

AL4032: Aluminum Alloy 4032 (Si content: 11-13.5%)

DISPAL: an aluminum alloy featuring an Si content of 12-40%

Alumite 1: AL2011 whose entire surface was applied with an alumite film of 5 μm

Alumite 2: AL2011 whose entire surface was applied with an alumite film of 10 μm Alumite 3: AL4032 whose entire surface was applied with an alumite film of 10 μm Alumite 4: AL4032 whose entire surface was applied with an alumite film of 50 μm Alumite 5: DISPAL whose entire surface was applied with an alumite film of 80 μm <<Evaluation>>

As listed in Table 9-Table 11, recording methods 1-75 in combination of an ink-jet printer and an ink set were evaluated as described below.

[Evaluation of Precipitation Resistance]

Each ink-jet printer produced above was filled with an ink set from the ink tank to the ink-jet head containing a manifold based on the combination listed in Table 9-Table 11, and then allowed to stand in this filled state under an ambience of 23° C. for 3 days. Thereafter, the presence or absence of precipitates in the intermediate unit tank, the manifold, and the ink-jet head was visually observed. Evaluation of precipitation resistance was conducted based on the following criteria.

5: No occurrence of precipitates is noted at all in the interior walls of the object members.

4: Occurrence of minute precipitates is slightly noted in the interior walls of the object members, resulting in being unproblematic at all 3: Occurrence of precipitates is noted to some extent in the interior walls of the object members but no ejection performance is adversely affected.

2: Occurrence of precipitates is noted in wide areas of the interior walls of the object members but only ejection performance is apprehended to be adversely affected.

1: Occurrence of coarse precipitates is noted in wide areas of the interior walls of the object members, resulting in no practical viability.

[Evaluation of Ejection Stability]

Each ink-jet printer produced above was filled with an ink set from the ink tank to the ink-jet head containing a manifold based on the combination listed in Table 9-Table 11. The ink-jet head was constituted so that multi-size dots of 2-20 pl could be ejected with a nozzle number of 256 at a resolution of 720×720 dpi (dpi represents the number of dots per 2.54 cm). The intermediate unit tank and the ink-jet head were mounted with a heating member. While heating was applied from the outside at 50° C., continuous ejection was carried out for 3 hours. Subsequently, the ejection state of each of the individual color inks was visually observed to determine the average ejection state thereof. Ejection stability was evaluated based on the following criteria.

5: No occurrence of nozzle lack or curved ejection is noted in all the nozzles.

4: No occurrence of nozzle lack is noted in all the nozzles but occurrence of slightly curved ejection is noted in only a small number of the nozzles.

3: No occurrence of nozzle lack is noted in all the nozzles but 1-3 nozzles generating curved ejection are noted.

2: Occurrence of nozzle lack is noted in some nozzles and at least 4 nozzles generating apparently curved ejection are noted.

1: Multiple occurrences of apparent nozzle lack and curved ejection are noted, resulting in no practical viability.

The thus-obtained results are shown in Table 9-Table 11.

TABLE 9

| Recording Method | Ink Set | Ink-jet Printer | Precipitation Resistance | Ejection Stability | Remarks |
|---|---|---|---|---|---|
| 1 | 1A | 1 | 2 | 3 | comparative |
| 2 | 1A | 2 | 4 | 1 | comparative |
| 3 | 1A | 3 | 1 | 3 | comparative |
| 4 | 1A | 4 | 1 | 3 | comparative |
| 5 | 1A | 5 | 1 | 3 | comparative |
| 6 | 1A | 6 | 3 | 3 | inventive |
| 7 | 1A | 7 | 4 | 3 | inventive |
| 8 | 1A | 8 | 4 | 3 | inventive |
| 9 | 1A | 9 | 5 | 5 | inventive |
| 10 | 1A | 10 | 5 | 5 | inventive |
| 11 | 1A | 11 | 1 | 3 | comparative |
| 12 | 1A | 12 | 1 | 3 | comparative |
| 13 | 1A | 13 | 1 | 3 | comparative |
| 14 | 1A | 14 | 4 | 3 | inventive |
| 15 | 1A | 15 | 5 | 5 | Inventive |
| 16 | 1A | 16 | 5 | 5 | inventive |
| 17 | 1A | 17 | 3 | 1 | comparative |
| 18 | 1A | 18 | 1 | 2 | comparative |
| 19 | 1A | 19 | 1 | 3 | comparative |
| 20 | 1A | 20 | 1 | 3 | comparative |
| 21 | 1A | 21 | 3 | 3 | inventive |
| 22 | 1A | 22 | 4 | 3 | inventive |
| 23 | 1A | 23 | 4 | 4 | inventive |
| 24 | 1A | 24 | 5 | 5 | inventive |
| 25 | 1A | 25 | 5 | 5 | inventive |

TABLE 10

| Recording Method | Ink Set | Ink-jet Printer | Precipitation Resistance | Ejection Stability | Remarks |
|---|---|---|---|---|---|
| 26 | 2A | 1 | 2 | 3 | comparative |
| 27 | 2A | 2 | 4 | 1 | comparative |
| 28 | 2A | 3 | 1 | 2 | comparative |
| 29 | 2A | 4 | 1 | 2 | comparative |
| 30 | 2A | 5 | 1 | 3 | comparative |
| 31 | 2A | 6 | 3 | 3 | inventive |
| 32 | 2A | 7 | 4 | 3 | inventive |
| 33 | 2A | 8 | 4 | 4 | inventive |
| 34 | 2A | 9 | 5 | 5 | inventive |
| 35 | 2A | 10 | 5 | 5 | inventive |
| 36 | 2A | 11 | 1 | 2 | comparative |
| 37 | 2A | 12 | 1 | 2 | comparative |
| 38 | 2A | 13 | 1 | 2 | comparative |
| 39 | 2A | 14 | 4 | 3 | inventive |
| 40 | 2A | 15 | 5 | 5 | inventive |
| 41 | 2A | 16 | 5 | 5 | inventive |
| 42 | 2A | 17 | 3 | 1 | comparative |
| 43 | 2A | 18 | 1 | 2 | comparative |
| 44 | 2A | 19 | 1 | 2 | comparative |
| 45 | 2A | 20 | 1 | 2 | comparative |
| 46 | 2A | 21 | 3 | 3 | inventive |
| 47 | 2A | 22 | 4 | 4 | inventive |
| 48 | 2A | 23 | 4 | 5 | inventive |
| 49 | 2A | 24 | 5 | 5 | inventive |
| 50 | 2A | 25 | 5 | 5 | inventive |

TABLE 11

| Recording Method | Ink Set | Ink-jet Printer | Precipitation Resistance | Ejection Stability | Remarks |
|---|---|---|---|---|---|
| 51 | 3A | 1 | 2 | 3 | comparative |
| 52 | 3A | 2 | 4 | 1 | comparative |
| 53 | 3A | 3 | 1 | 2 | comparative |
| 54 | 3A | 4 | 1 | 2 | comparative |
| 55 | 3A | 5 | 1 | 3 | comparative |
| 56 | 3A | 6 | 3 | 3 | inventive |
| 57 | 3A | 7 | 4 | 3 | inventive |
| 58 | 3A | 8 | 4 | 4 | inventive |
| 59 | 3A | 9 | 5 | 5 | inventive |
| 60 | 3A | 10 | 5 | 5 | inventive |

TABLE 11-continued

| Recording Method | Ink Set | Ink-jet Printer | Precipitation Resistance | Ejection Stability | Remarks |
|---|---|---|---|---|---|
| 61 | 3A | 11 | 1 | 2 | comparative |
| 62 | 3A | 12 | 1 | 2 | comparative |
| 63 | 3A | 13 | 1 | 2 | comparative |
| 64 | 3A | 14 | 4 | 3 | inventive |
| 65 | 3A | 15 | 5 | 5 | inventive |
| 66 | 3A | 16 | 5 | 5 | inventive |
| 67 | 3A | 17 | 3 | 1 | comparative |
| 68 | 3A | 18 | 1 | 2 | comparative |
| 69 | 3A | 19 | 1 | 2 | comparative |
| 70 | 3A | 20 | 1 | 2 | comparative |
| 71 | 3A | 21 | 3 | 3 | inventive |
| 72 | 3A | 22 | 4 | 4 | inventive |
| 73 | 3A | 23 | 4 | 5 | inventive |
| 74 | 3A | 24 | 5 | 5 | inventive |
| 75 | 3A | 25 | 5 | 5 | inventive |

Table 9-Table 11 clearly show that in any recording method using an ink-jet printer employing an ink-jet head which contains a manifold and is constituted of an alumite-treated aluminum member, excellent precipitation resistance and excellent ejection stability during continuous ejection while the manifold and the ink-jet head are heated are expressed, compared to the comparative examples.

What is claimed is:

1. An ink-jet head used to form an image on a recording medium by ejecting an ink-jet ink from a nozzle, the ink-jet head comprising:

a head tip to eject an ink containing a cationically polymerizable composition containing a cationically polymerizable compound and a cationic polymerization initiator or a radically polymerizable composition containing a radically polymerizable monomer and a photoradical polymerization initiator, a manifold to supply the ink to the head tip, a connection portion provided between the manifold and the head tip and a filter to filter the ink-jet ink, the ink-head tip having an ink supply opening and an ink ejection orifice from which the ink is ejected, wherein the connection portion connects to the ink supply opening of the ink-head tip so that the ink is supplied from the manifold through the connection portion to the ink-head tip, wherein a surface of a metal constituting a liquid contact member in contact with the ink-jet ink inside the ink-jet head is at least partially subjected to a passive treatment or an insulating film treatment, the metal being stainless steel, and wherein the liquid contact member is at least one selected from the manifold, the connection portion and the filter.

2. The ink-jet head described in claim 1, wherein the surface of the metal constituting the above liquid contact member in contact with an ink-jet ink is entirely subjected to a passive treatment or an insulating film treatment.

3. An ink-jet printer forming an image on a recording medium by ejecting an ink-jet ink from a nozzle of an ink-jet head, wherein, the ink-jet ink comprises a cationically polymerizable composition containing a cationically polymerizable compound and a cationic polymerization initiator or a radically polymerizable composition containing a radically polymerizable monomer and a photoradical polymerization initiator; and wherein the ink-jet head is one described in claim 1.

4. An ink-jet recording method comprising the step of:

ejecting an ink-jet ink onto a recording medium from a nozzle of an ink-jet head, to make an image, using the ink-jet printer described in claim 3, wherein the cationically polymerizable compound is an oxetane ring-containing compound or an epoxy compound.

5. The ink-jet recording method described in claim 4, wherein the ink-jet ink contains a vinyl ether compound as a cationically polymerizable monomer.

6. The ink-jet recording method described in claim 4, wherein the ink-jet ink contains a photolytically acid generating agent.

7. The ink-jet head described in claim 1, wherein the passive treatment or the insulating film treatment is selected from acid treatment, acid color generating treatment, fluorinated passive treatment or $Cr_2O_3$ passive treatment.

* * * * *